(12) United States Patent
Kiyota

(10) Patent No.: US 11,022,847 B2
(45) Date of Patent: Jun. 1, 2021

(54) LIQUID CRYSTAL DISPLAY AND METHOD FOR MANUFACTURING THE SAME

(71) Applicant: Mitsubishi Electric Corporation, Tokyo (JP)

(72) Inventor: Kazushi Kiyota, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/667,363

(22) Filed: Oct. 29, 2019

(65) Prior Publication Data

US 2020/0166809 A1 May 28, 2020

(30) Foreign Application Priority Data

Nov. 22, 2018 (JP) .............................. JP2018-219310

(51) Int. Cl.
| | |
|---|---|
| *G02F 1/1337* | (2006.01) |
| *G02F 1/1339* | (2006.01) |
| *G02F 1/1333* | (2006.01) |
| *G02F 1/13* | (2006.01) |
| *G02F 1/1341* | (2006.01) |
| *G02F 1/1335* | (2006.01) |
| *G02F 1/1343* | (2006.01) |
| *G02F 1/1368* | (2006.01) |

(52) U.S. Cl.
CPC ...... *G02F 1/133723* (2013.01); *G02F 1/1309* (2013.01); *G02F 1/1339* (2013.01); *G02F 1/133308* (2013.01); *G02F 1/133351* (2013.01); *G02F 1/1341* (2013.01); *G02F 1/1368* (2013.01); *G02F 1/13332* (2021.01); *G02F 1/13415* (2021.01); *G02F 1/13439* (2013.01); *G02F 1/133325* (2021.01); *G02F 1/133354* (2021.01); *G02F 1/133514* (2013.01); *G02F 2202/28* (2013.01)

(58) Field of Classification Search
None
See application file for complete search history.

(56) References Cited

U.S. PATENT DOCUMENTS

| | | | | |
|---|---|---|---|---|
| 2012/0057115 | A1* | 3/2012 | Kunimatsu | ....... G02F 1/133723 349/123 |
| 2019/0377218 | A1* | 12/2019 | Liu | ..................... C09K 19/3001 |

FOREIGN PATENT DOCUMENTS

JP  2000171802 A  6/2000

* cited by examiner

*Primary Examiner* — James A Dudek
(74) *Attorney, Agent, or Firm* — Studebaker & Brackett PC

(57) ABSTRACT

Provided is a liquid crystal display in lateral-electric-field mode that improves faulty display resulting from static electricity without, in particular, degrading display quality or considerably increasing costs. A liquid crystal display in one aspect of the present invention includes the following: an array substrate and counter substrate processed into a thin plate that is less than 0.5 mm thick; a liquid crystal layer sealed between this pair of substrates; and an alignment film disposed on the counter substrate. The alignment film has a photoconductivity in which the volume resistance value of the alignment film under light irradiation changes to at least not greater than $\frac{1}{10}$ of the volume resistance value of the alignment film under no light irradiation.

18 Claims, 5 Drawing Sheets ved model of liquid crystal display that includes a
high-resistance alignment film particularly exhibits a con-
spicuous bright-spot defect and/or display unevenness as
mentioned above. There is a difference in manufacture
process between the thin model and curved model of liquid
crystal display and a typical liquid crystal display. The
process for manufacturing the thin model and curved model
of liquid crystal display includes a polishing step (also called
a slimming step) of processing a mother glass substrate into
a thin substrate through polishing or other methods, whereas
the process for manufacturing the typical liquid crystal
display does not include such a slimming step.

LIQUID CRYSTAL DISPLAY AND METHOD FOR MANUFACTURING THE SAME

BACKGROUND OF THE INVENTION

Field of the Invention

The present invention relates to liquid crystal displays, and particularly, to a liquid crystal display that includes a liquid crystal panel in lateral-electric-field mode.

Description of the Background Art

A liquid crystal display having a liquid crystal panel in lateral-electric-field mode, where a voltage is applied in parallel across a substrate surface, includes a substrate on which driving elements, such as thin film transistors (TFTs), are arranged. Such a substrate is also called a TFT array substrate or merely an array substrate. On the array substrate, electrodes are arranged. No electrodes are arranged on a counter substrate, also called a color filter (CF) substrate, where a color filter and other components are disposed. For this reason, external electric fields, such as static electricity, enter through the counter substrate, or the counter substrate exhibits a local buildup of static electricity in its surface, thus causing some problems with what is displayed on the liquid crystal panel.

A conventional liquid crystal display that includes such a typical liquid crystal panel in lateral-electric-field mode address the aforementioned electro-static discharge (ESD) in the following way: This liquid crystal display is structured such that a transparent conductive layer composed of an indium tin oxide (ITO) film is put on the glass surface on the display surface of the counter substrate (i.e., a surface opposite from the array substrate) in order to prevent the entrance of external electric fields through the counter substrate. The transparent conductive layer is also called a "backside ITO", as it is placed on the backside of the surface where the color filter is placed.

In some cases, the liquid crystal display in lateral-electric-field mode includes a high-resistance alignment film (e.g., a polyimide formed by processing, as a precursor, a polyamide acid into an imide) in order to improve reliability and optical properties. In particular, a photoalignment film that uses polarized light in an alignment process is frequently used in the liquid crystal display in lateral-electric-field mode along with the demand for high image quality. The photoalignment film needs to have a large amount of photodegradable-polymer molecules in order to stabilize alignment properties. Imides are accordingly produced at a high rate when polyimides are formed. This provides an alignment film having high resistivity and high resistance.

The use of such a high-resistance alignment film can cause a local buildup of static electricity in the substrate surface inside a cell of the counter substrate, thus possibly causing a faulty display state (faulty display) such as a bright-spot defect and display unevenness. In particular, the inventor conducted a detailed study to find out that whether such a bright-spot defect and/or display unevenness occurs conspicuously correlates with the timing for forming the aforementioned backside ITO in the process for manufacturing the liquid crystal display. To be specific, a thin model of liquid crystal display and a curved model of liquid crystal display have been commercialized along with the recent demands for a thin and lightweight liquid crystal display and for a curved display device having a curved display surface. The inventor has focused on the fact that such a thin model Reference is made to the timing for forming the backside ITO. In the typical liquid crystal display manufactured without the slimming step, the backside ITO is formed before the mother glass substrate is attached. In the thin model and curved model of liquid crystal display manufactured through the slimming step, the backside ITO is typically formed after the slimming step. The mother glass substrate provided with the backside ITO reduces a buildup of static electricity in itself and makes the electric charges accumulated in the mother glass substrate uniform. Thus, the mother glass substrate reduces the buildup of static electricity in itself and makes the accumulated electric charges uniform, in its subsequent individual process steps in the manufacture process after the formation of the backside ITO. Improvements consequently seem to be made in the occurrence of the aforementioned bright-spot defect and/or display unevenness. In the thin model and curved model of liquid crystal display, manufactured through the slimming step, in contrast, the mother glass substrate repeatedly exhibits a local buildup of static electricity in itself or local accumulation of electric charges in itself, in at least all process steps before the slimming step, which is a process step before the backside ITO is formed. Such repeated accumulation seems to cause a conspicuous occurrence of the aforementioned bright-spot defect and/or display unevenness.

If the timing for forming the backside ITO is a factor, even the thin model and curved model of liquid crystal display, manufactured through the slimming step, can make improvements in the aforementioned occurrence of a bright-spot defect and/or display unevenness. Such improvements are achieved by a process of adding a dummy backside ITO, i.e., a backside ITO that is to be removed, before attaching the mother glass substrate, followed by removing the dummy backside ITO immediately before the slimming step and then performing the slimming step, followed by forming an actually desired backside ITO. However, the additional steps of forming a dummy backside ITO and of removing the dummy backside ITO that are essentially unnecessary involve an extended manufacture period and require ITO materials, chemical solutions, various devices, and other things for performing the process. The process is hence hard to apply practically because it involves a great cost increase.

There is another factor for the conspicuous occurrence of the aforementioned bright-spot defect and/or display unevenness that can be seen particularly in the thin model and curved model of liquid crystal display each of which includes a high-resistance alignment film. Whether a local buildup of static electricity in the substrate surface inside the cell of the counter substrate causes a conspicuous bright-spot defect and/or display unevenness is affected by capacity size, because an electric field caused by the buildup of static electricity exerts its effect on liquid crystals, thus causing such a bright-spot defect and/or display unevenness. In particular, each of the thin model and curved model has a thin glass substrate that corresponds to a dielectric between the backside ITOs that are composed of electric charges excited in the substrate surface inside the cell and of a capacitance electrode. For this reason, the thin model and curved model have a larger capacity than the typical liquid crystal display. As a result, the thin model and curved model of liquid crystal display tend to exhibit a local buildup of static electricity at the timing of forming the backside ITO, and thus receive a large electric field exerted on the liquid crystals by the buildup of static electricity or have a large capacity. For this reasons, a large amount of electric charges accumulates, and once a buildup of static electricity has occurred, electric charges are hard to remove. Such an interaction particularly causes a conspicuous occurrence of the aforementioned bright-spot defect and/or display unevenness. Since an occurrence of a bright-spot defect and/or display unevenness correlates with the thickness of the glass substrate per se, applying the aforementioned process of forming the dummy backside ITO does not necessarily make sufficient improvements in the occurrence of the bright-spot defect and/or display unevenness.

Conventional arts have pointed out that the use of a high-resistance alignment film leads to defects resulting from static electricity generated during the manufacture process. Japanese Patent Application Laid-Open No. 2000-171802, for instance, describes a liquid crystal display that includes a low-resistance alignment film made of a material containing a conductive substance previously, so that an electrostatic breakdown can be avoided that results from static electricity generated during the manufacture process or a burn phenomenon can be avoided that results from a direct-current component that remains when the same pattern is displayed continuously.

Unfortunately, if a material for the alignment film is processed to have an excessively low resistance, like the configuration in Japanese Patent Application Laid-Open No. 2000-171802, a voltage holding ratio (VHR), corresponding to the ability to hold a display potential, lowers to cause a degradation in display quality (e.g., screen flicker that occurs in gray scale display, or brightness and contrast degradation). In other words, inordinately processing the material for the alignment film into a low-resistance material causes a different failure. Resistance setting and selection of a material for the alignment film that are necessary for improving various defects, are thus difficult. In addition, Japanese Patent Application Laid-Open No. 2000-171802 is silent about a thin model and curved model of liquid crystal display and is silent about a bright-spot defect and/or display unevenness that is conspicuously seen and could be a problem in such a liquid crystal display. Japanese Patent Application Laid-Open No. 2000-171802 fails to describe any method for solving a characteristic problem in the thin model and curved model of liquid crystal display.

SUMMARY

It is an object to provide a liquid crystal display in lateral-electric-field mode that improves an occurrence of a display failure resulting from static electricity without degrading display quality or considerably increasing costs.

A liquid crystal display according to an aspect of the present invention includes a liquid crystal panel in a lateral-electric-field mode. The liquid crystal panel includes an array substrate and a counter substrate. The array substrate and the counter substrate are formed of a pair of transparent insulating substrates facing each other and processed into a thin plate that is less than 0.5 mm thick. The liquid crystal panel also includes a sealant disposed between the pair of transparent insulating substrates. The liquid crystal panel also includes a liquid crystal layer sealed in a region defined by the sealant disposed between the pair of transparent insulating substrates. The liquid crystal display also includes an alignment film disposed on the counter substrate. The alignment film is made of a material having a photoconductivity in which the volume resistance value of the alignment film under light irradiation changes to at least not greater than $1/10$ of the volume resistance value of the alignment film under no light irradiation.

The aforementioned liquid crystal display improves a display failure resulting from static electricity, without degrading display quality or considerably increasing costs.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

<Configuration of Liquid Crystal Display (Liquid Crystal Panel)>

Figure 1:
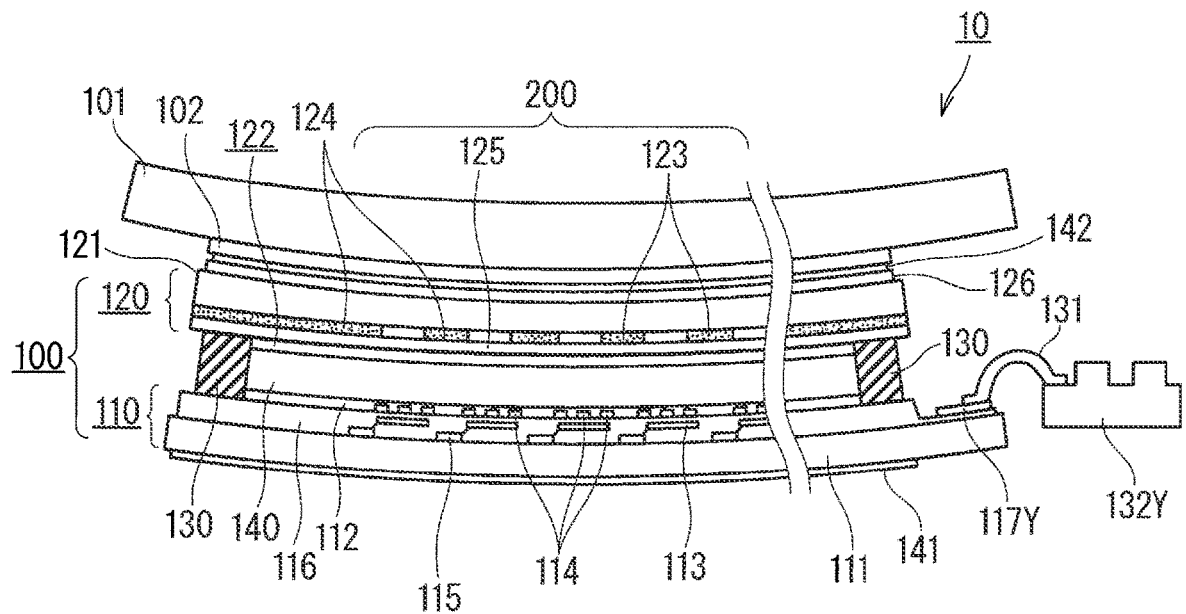
FIG. 1 is a cross-sectional view of a liquid crystal display according to a first preferred embodiment of the present invention.
Figure 2:
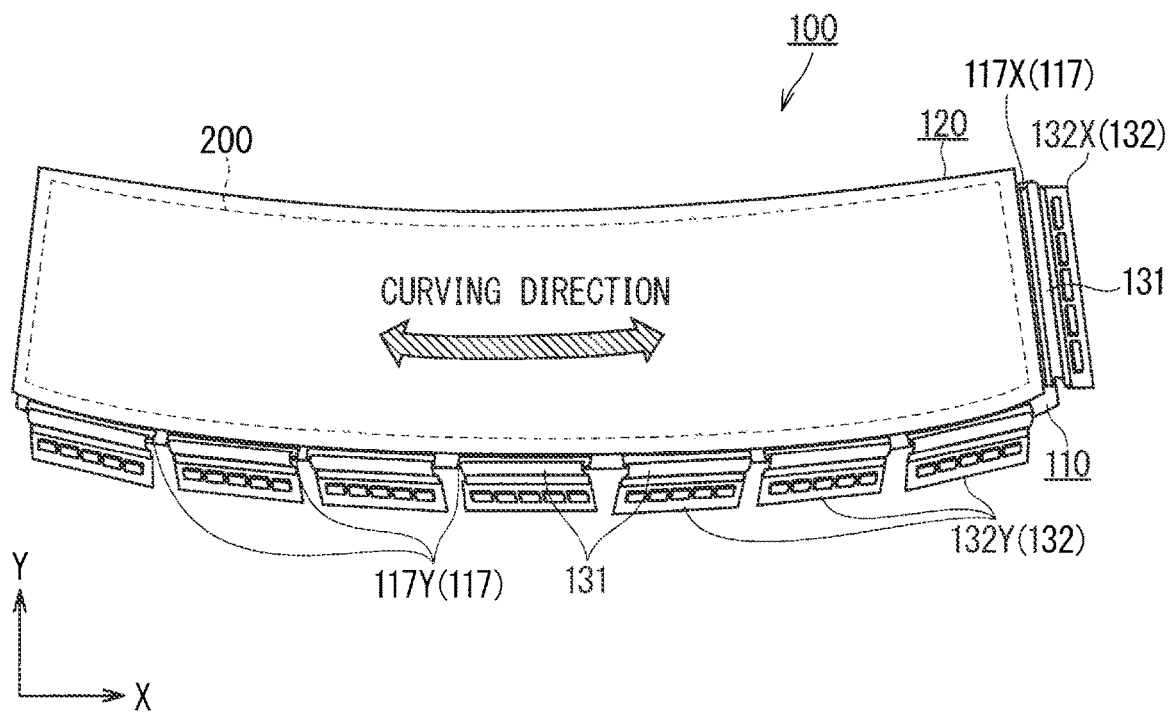
FIG. 2 is a perspective view of a liquid crystal panel included in the liquid crystal display according to the first preferred embodiment of the present invention.
Figure 3:
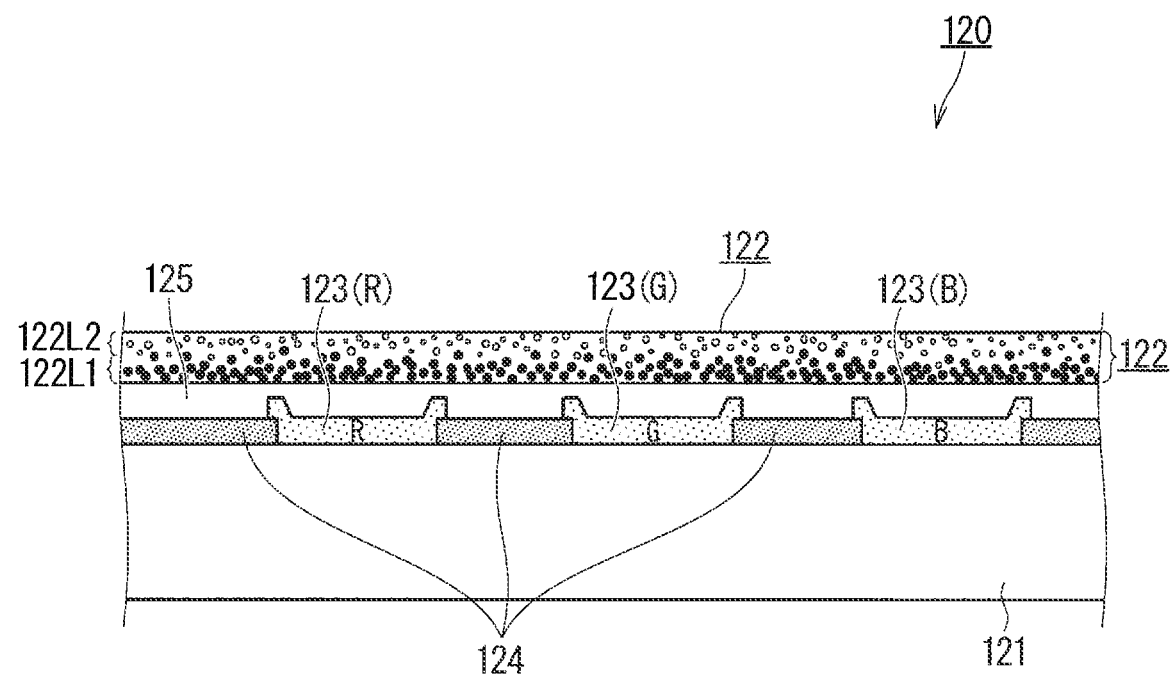
FIG. 3 is a cross-sectional view of the principal component of a color filter substrate included in the liquid crystal display according to the first preferred embodiment of the present invention.

The present invention is applied to a curved type of liquid crystal display, also called a curved liquid crystal display. The following describes this curved type of liquid crystal display according to a first preferred embodiment and the configuration of a liquid crystal panel included in the liquid crystal display, with reference to FIGS. 1 to 3. FIGS. 1 and 2 schematically illustrate a curved liquid crystal display 10 according to the first preferred embodiment of the present invention. FIG. 3 is a cross-sectional view of an alignment film disposed on a color filter substrate, which is a principal component. The configuration of the curved liquid crystal display 10 will be described with reference to FIGS. 1 and 2. FIG. 1 is a cross-sectional view of the entire liquid crystal display. FIG. 2 is a perspective view of the entire liquid crystal panel. The drawings are schematic and thus do not reflect the exact size of components described herein. The repetition of display pixels is omitted, and film configuration is partly simplified. Components identical to those described in previous drawings are denoted by identical sings, and the description of the identical components will not be elaborated upon. The same holds true for the rest of the drawings.

In the following description, the present invention is applied to the curved liquid crystal display 10 that includes a liquid crystal panel 100 transformed into a shape that is curved in one direction. The liquid crystal panel 100 is an example of a liquid crystal panel in lateral-electric-field mode, where thin film transistors (TFTs) are used as switching elements for operation. In particular, the liquid crystal panel 100 operates in fringe-field switching (FFS) mode. As illustrated in the cross-sectional view of FIG. 1, the curved liquid crystal display 10 includes the liquid crystal panel 100, which is a main component, and a curved transparent protector 101 whose holding surface is a curved surface having a predetermined curvature (curvature radius). The liquid crystal panel 100 and the curved transparent protector 101 are attached to each other via a transparent adhesive sheet 102.

The liquid crystal panel 100 includes the following specific components: a TFT array substrate 110 (hereinafter referred to as an array substrate 110) on which TFTs are arranged; a color filter substrate 120 (hereinafter referred to as a counter substrate 120) facing the array substrate 110 and has a display region (i.e., display surface) 200 for displaying an image; a resin sealant 130 that is provided to surround a region corresponding to the display region 200 between the array substrate 110 and the counter substrate 120, and is used for attaching these substrates to each other; and a liquid crystal layer 140 defined by the sealant 130 and sealed in the region corresponding to the display region 200 between the array substrate 110 and the counter substrate 120. The curved liquid crystal display 10 that includes these components has an appearance such that the liquid crystal panel 100 is curved at a predetermined curvature, in a direction where the counter substrate 120 provided with the display region 200, corresponding to a display surface for displaying an image, is dented. The liquid crystal panel 100 thus has a display surface curved at the predetermined curvature.

The sealant 130 is disposed in a frame region located outside the display region 200, which corresponds to a display surface for displaying an image. Both array substrate 110 and counter substrate 120 have a rectangular shape. The array substrate 110 is larger in shape than the counter substrate 120. As seen in the drawing, the array substrate 110 has lower and right sides on which signal terminals 117 (i.e., signal terminals 117X and 117Y) described later on are placed. On the lower and right sides, the ends of the array substrate 110 are partly protruded from the respective ends of the counter substrate 120. The array substrate 110 is superposed on the counter substrate 120.

The curved arrow in FIG. 2 conceptually denotes a curving direction in which the curved liquid crystal display 10 is curved at the predetermined curvature. As seen from the drawing, the curving direction is a direction in which a curving curvature reaches its maximum in a direction parallel to the longitudinal direction of the liquid crystal panel 100. Herein, the longer-side direction of the rectangular array substrate 110 and counter substrate 120 is set to be a longitudinal direction as a reference.

Between the array substrate 110 and the counter substrate 120, multiple columnar spacers (not shown) are arranged in the display region 200. The columnar spacers produce and maintain a predetermined range of gap between these substrates. In other words, the columnar spacers maintain the distance between the substrates in a predetermined range. The first preferred embodiment handles a dual spacer structure that includes two different kinds of columnar spacer. In this dual spacer structure, some of the columnar spacers are relatively high (or relatively long in a direction perpendicular to each substrate surface). These relatively high spacers (called main spacers) are normally in contact with the substrates facing each other, and hold the distance between the substrates. The other columnar spacers are relatively low (or relatively short in the direction perpendicular to each substrate surface). The relatively low spacers (called sub-spacers) are normally not contact with the substrates facing each other and do not serve as a holder between the substrates. The relatively low spacers come into contact with the substrates facing each other and hold the distance between the substrates, when an external force or other factors reduces the distance between the substrates.

The array substrate 110 and the counter substrate 120, constituting a pair of substrates facing each other, have their respective components disposed on glass substrates 111 and 121, both of which are transparent insulating substrates. The glass substrate 111 and the glass substrate 121, respectively constituting the array substrate 110 and the counter substrate 120, are each desirably composed of a glass substrate processed into a thin plate that is about less than 0.2 mm thick, so as to have flexibility such that the glass substrate is transformed into a curved shape having a predetermined curvature. The first preferred embodiment handles a glass substrate whose thickness is set to be about 0.15 mm (e.g., the thickness is regulated within a center value of 0.15 mm and tolerance of ±20%) in view of easy processing, as earlier described.

The following details the counter substrate 120. As earlier described, at least in the display region 200 on one of the surfaces of the glass substrate 121 that is about 0.15 mm thick, the counter substrate 120 includes an alignment film 122 for aligning liquid crystals, and color filters 123 below the alignment film 122. The color filters 123 herein consist of an arrangement of colorant layers corresponding to the three primary colors: red (R), green (G), and blue (B). The counter substrate 120 also includes a black matrix (BM) 124 (i.e., light shielding layer) that is used for shielding the spaces between the color filters 123 from light or shielding the frame region, located outside the display region 200, from light. The counter substrate 120 also includes an overcoat layer (i.e., OC layer) 125, and other components. The OC layer 125 is disposed in the lower part than the alignment film, covers the color filters 123 and BM 124, and is composed of a transparent resin film that flattens the surface of the counter substrate 120 by flattening surface steps produced by the color filters 123 and the BM 124. In the first preferred embodiment, the alignment film 122 on the surface of the counter substrate 120 is composed of a photoalignment film made of a material that has undergone a photoalignment process and thus has a capability of alignment control. The alignment film 122 is specifically composed of a phase-separation photoalignment film having, in particular, different compositions and properties between its upper and lower parts. The alignment film 122 is particularly a characteristic component in the present invention. The configuration of the alignment film 122 and the method of its production will thus be detailed later on, and will not be elaborated upon here.

The aforementioned columnar spacers, which are located between the array substrate 110 and the counter substrate 120, are adhered to the surface of the counter substrate 120, particularly to the surface of the overcoat layer (i.e., OC layer) 125.

A transparent conductive layer 126 is disposed on the other surface of the glass substrate 121 of the counter substrate 120, i.e., on a surface opposite from the surface where the color filters 123, the BM 124, and other components are disposed. The transparent conductive layer 126 is grounded and is used for protection against static electricity. This antistatic transparent conductive layer 126 is a transparent conductive film (e.g., an indium tin oxide film or an ITO film for short) that covers at least the display region 200 on the glass substrate 121, and is also called a "backside ITO". The transparent conductive layer 126 is effective for protecting a liquid crystal panel in lateral-electric-field mode against a display failure resulting from a buildup of static electricity or from an external electric field.

The following details the configuration of the array substrate 110. As earlier described, the components of the array substrate 110 are disposed on the glass substrate 111 that is about 0.15 mm thick. The components disposed in the display region 200 on the array substrate 110 will be first described. In the display region 200, the array substrate 110 includes an alignment film 112 disposed on one of the surfaces of the glass substrate 111 and is used for aligning liquid crystals. The array substrate 110 also includes pairs of pixel electrode 113 and counter electrode 114. The pairs of pixel electrode 113 and counter electrode 114 are disposed in the lower part of the alignment film 112, and apply a voltage that generates an electric field in a direction parallel with the surface of the array substrate 110 or counter substrate 120, to drive the liquid crystals. The array substrate 110 also includes TFTs 115 each being a switching element that supplies a voltage to the pixel electrode 113, which is one of the pair of electrodes. The array substrate 110 also includes an insulating film 116 disposed over the TFTs 115. The array substrate 110 also includes a plurality of scanning signal lines (hereinafter also referred to as gate wires) and a plurality of video signal lines (hereinafter also referred to as source wires). The scanning signal lines and the video signal lines, which do not appear in the drawing, are wires for supplying a signal to the TFTs 115. As is the case with the alignment film 122 on the counter substrate 120, the alignment film 112 is composed of a photoalignment film made of a material that has undergone a photoalignment process and thus has a capability of alignment control.

Each TFT 115 has a semiconductor layer constituting an active layer of the transistor. The TFT 115 also has a gate electrode (in some cases, the gate electrode is provided in common with part of the gate wire) disposed above the semiconductor layer, and also has a source electrode, a drain electrode, and other components. These three electrodes are not shown in the drawing. The TFT 115 is electrically connected to the corresponding source wire via the source electrode and to the corresponding pixel electrode 113 via the drain electrode (the drawing schematically illustrates a connection relationship alone by connecting the TFT 115 to the pixel electrode 113 with a line). Each of the gate wire and source wire as well as the gate electrode, source electrode, and drain electrode included in the TFT 115, is composed of a metal film that constitutes a light shielding layer.

In the first preferred embodiment, each pixel electrode 113 and each counter electrode 114, which are a pair of electrodes that applies a voltage for driving the liquid crystals, are schematically illustrated in the cross-sectional view. The pixel electrode 113, one of the electrodes, is composed of a transparent conductive film pattern in the form of a plate. The counter electrode 114, the other electrode, is composed of a transparent conductive film pattern having slit electrodes having a plurality of openings in the form of slits arranged in parallel in a region overlapping the pixel electrode 113. The counter electrode 114 is superposed on the pixel electrode 113 via the insulating film 116, in at least a region where the slit electrodes are located. The transparent conductive film pattern forming the counter electrode 114 may be configured to have an opening in a region overlapping the corresponding TFT 115.

The aforementioned configuration of the pixel electrode 113 and counter electrode 114 is not essential; both pixel electrode 113 and counter electrode 114, typical electrodes in a conventional liquid crystal display in lateral-electric-field mode, may be comb-shaped electrodes. In another embodiment of the liquid crystal display in FFS mode, the shape of the pixel electrode 113 and the shape of the counter electrode 114 may be interchanged, and the arrangement of the pixel electrode 113 and counter electrode 114 may be upside down. That is, the multiple pixel electrodes 113 in the form of a pattern that has slit electrodes having openings in the form of slits arranged in parallel may be disposed above the counter electrode 114, and the counter electrode 114 in the form of a plate may be disposed below the pixel electrodes 113. In addition, the TFTs 115 each may be connected to the corresponding pixel electrodes 113 in the form of a pattern having slit electrodes, and apply a voltage.

The insulating film 116, included in the array substrate 110, is simply shown in the drawing as an integrated insulating film consisting of, for instance, individual insulating films that insulate the semiconductor layer, gate electrode, source electrode, and drain electrode of the TFT 115 from each other, and of an insulating film covering the TFT 115 or an insulating film located between the pixel electrode 113 and the counter electrode 114. The insulating film 116 is practically composed of a single-layer transparent insulating film between these electrodes and other things, or is composed of a laminated layer consisting of multiple transparent insulating films between these electrodes and other things.

The following describes a component disposed in the frame region on the array substrate 110. The signal terminals 117 (i.e., signal terminals 117X and 117Y) are arranged in the frame region on the array substrate 110, particularly, on the surface where the counter substrate 120 is disposed, in the protrusions partly protruding from the ends of the counter substrate 120. The signal terminals 117 receive the signal supplied to the TFTs 115, from outside. Although in the cross-sectional view in the curving direction (c.f., FIG. 1), the signal terminal 117Y is shown at only one of the ends of the liquid crystal panel 100 (array substrate 110), the signal terminals 117 (i.e., signal terminals 117X and 117Y) are disposed in the frame region on respective two of the sides of the array substrate 110 so as to correspond to the protrusions located on the aforementioned two sides of the array substrate 110 adjacent to each other. In addition, the signal terminal 117X on the side in a direction perpendicular to the curving direction (i.e., a direction parallel with direction Y in the drawing) supplies a scanning signal to the gate wire, and the signal terminal 117Y on the side in a direction parallel with the curving direction (i.e., a direction parallel with direction X in the drawing) supplies a video signal to the source wire. More specifically, the signal terminals 117 (i.e., signal terminals 117X and 117Y) are configured such that multiple rectangular pads that are separate from each other so as to correspond to multiple signals, the rectangular pads being arranged along the ends of the substrate.

These respective signal terminal pads on the two adjacent sides of the array substrate 110 are connected to control substrates 132 (i.e., control substrates 132X and 132Y) each equipped with a control integrated circuit (1C) chip that generates, for instance. a control signal for controlling a driving IC via a flexible flat cable (FFC) 131 that serves as a connection wire. The control signal from the control substrate 132 (i.e., control substrates 132X and 132Y) is supplied, via the signal terminal 117 (i.e., signal terminals 117X and 117Y), to the input of a source-wire source driving IC chip (not shown) attached to the protrusion, or is supplied, via the signal terminal 117 (i.e., signal terminals 117X and 117Y), to the input of a gate-wire gate driving IC chip (not shown). An output signal from the output of the source driving IC or gate driving IC chip is supplied to the TFT 115 in the display region 200 via multiple signal leading wires (not shown) extending from the display region 200 and via the gate wire or source wire.

The foregoing has described an instance where the components, including the signal terminals 117, FFCs 131, and control substrates 132, are disposed on two of the sides of the liquid crystal panel 100. These components may be disposed on only one of the sides of the liquid crystal panel 100. In such a case, these components may be disposed on a side that undergoes a curving process or on a side that does not undergo a curving process.

The TFT array substrate 110 has a polarizer 141 on its surface that is an outer surface with respect to the liquid crystal layer 140. In addition, the counter substrate 120 has a polarizer 142 in the upper layer of the transparent conductive layer 126 disposed on a surface of the counter substrate 120 that is an outer surface with respect to the liquid crystal layer 140. The polarizers 141 and 142 are disposed to cover at least the display region 200 on the TFT substrate 110 and counter substrate 120, and is attached and is thus secured via an adhesive layer (not shown). The polarizers 141 and 142, although each illustrated as a signal plate, are each configured as a laminated structure in which a protective layer (TAC layer), a polarization layer (polarization film layer), a phase plate, a view-angle correction (wide-view) film, or other layers are attached together.

The transparent conductive layer 126 on the surface of the counter substrate 120 is grounded. Here, at the protrusion of the array substrate 110 is provided with a grounding pad, and the transparent conductive layer 126 and the grounding pad are connected to each other via conductive paste or conductive tape. This connected structure will not be elaborated upon here. An example of the conductive paste usable herein is silver paste, which serves as a typical conductive paste agent. An example of the conductive tape usable herein is a material with a conductive adhesive applied to a mother material that is made from metal foil, such as Al foil or Cu foil. Common conductive tape that is commercially available can be used.

A backlight unit (not shown) that serves as a light source is disposed to face the array substrate 110, which is opposite from the display surface 200 of the liquid crystal panel 100. In addition, between the liquid crystal panel 100 and the backlight unit is disposed an optical sheet for controlling, for instance, the polarization and directivity of light.

The liquid crystal panel 100 is attached to the curved transparent protector 101 having a curved shape alone as earlier described, via the transparent adhesive sheet 102. The liquid crystal panel 100 thus remains in the shape of a predetermined curve. Along with the backlight unit, the optical sheet, and other components, the liquid crystal panel 100 is contained in a casing (not shown) that is open in at least a portion outside the counter substrate 120 in the display region (i.e., display surface) 200. The liquid crystal display according to the first preferred embodiment is configured in the aforementioned manner.

The curved liquid crystal display 10 operates in the following manner. Upon reception of an electric signal from the control substrates 132, a driving voltage is applied to the pixel electrodes 113 and the common electrodes 114, thus changing the liquid crystal molecules in the liquid crystal layer 140 in accordance with the driving voltage. Then, light from a curved backlight disposed behind the backside of the liquid crystal panel 100 is transmitted to an observer through the array substrate 110, liquid crystal layer 140, and counter substrate 120, or is blocked, thereby displaying a video image and other things on the dented display surface 200 of the liquid crystal panel 100.

Reference is made to a direction of curving the display surface 200. The first preferred embodiment has described an example where the curved liquid crystal display 10 includes the liquid crystal panel 100 that is curved in such a manner that the display surface 200 is dented. In accordance with uses, the liquid crystal panel 100 may be curved in such a manner that the display surface 200 protrudes. In such a case, the liquid crystal panel 100 has the display surface 200 that protrudes.

<Configuration of Alignment Film>

With reference to the enlarged cross-sectional view of FIG. 3, the following details the alignment film 122, a characteristic component in the present invention, located on the surface of the counter substrate 120. In particular, the configuration of the alignment film 122 in its thickness direction will be detailed. The alignment film 122 includes a first layer 122L1 disposed on the counter substrate 120, and a second layer 122L2 disposed on the first layer 122L1. That is, the alignment film 122 includes, in its thickness direction, the first layer 122L1 that is a region disposed on a relatively lower side, and the second layer 122L2 that is a region disposed on an upper side with respect to the first layer 122L1. The lower first layer 122L1 is made of a high-photoconductivity alignment material. The upper second layer 122L2 is made of an alignment material having a photoalignment capability.

To be more specific, the high-photoconductivity alignment material forming the first layer 122L1 needs to be, for instance, a polyimide alignment agent formed by processing, as a precursor, a polyamide acid derived from a pyromellitic dianhydride (PMDA) into an imide. Referring to the rate of processing into an imide to form a polyimide in the lower first layer 122L1, a suitable condition about 40% or more can be selected.

The alignment material having a photoalignment capability and forming the second layer 122L2 needs to be, for instance, a polyimide alignment agent formed by processing, as a precursor, a polyamide acid alkyl ester having a photoalignment capability into an imide. The rate of processing into an imide to form a polyimide forming the upper second layer 122L2 needs to be higher than that of the alignment material forming the first layer 122L1 with the emphasis on alignment capability and in order to stabilize alignment properties. For instance, a suitable condition about 70% or more needs to be selected.

The drawing shows an image depicting the configuration of the alignment film 122, which is composed of a phase-separation alignment film formed by applying, through transfer, the mixed material of the aforementioned two different kinds of precursor, followed by heating and phase-separating the material. That is, the drawing shows that the alignment agent forming the lower first layer 122L1 and the alignment agent forming the upper second layer 122L2 are distributed while mixing with each other to a certain extent at their boundary, and are thus not clearly separated into upper and lower layers. The phase-separation provides a structure consisting of two layers that are more or less different from each other, depending on the properties of the mixed material consisting of two kinds of material, the degree of how much the material formed in the lower layer harmonizes with a base layer, the detailed conditions of a formation process, and other factors. Typically, speaking of a specific concentration distribution, the alignment film 122 has a lower layer in which the concentration of the alignment agent forming the first layer 122L1, i.e., the concentration of the alignment agent mainly contained in the first layer 122L1, is high and has such a gradient as to decrease gradually from the lower part of the first layer 122L1 toward the upper part of the first layer 122L1. The alignment film 122 has an upper layer in which the concentration of the alignment agent forming the second layer 122L2, i.e., the concentration of the alignment agent mainly contained in the second layer 122L2, is high and has such a gradient as to decrease gradually from the upper part of the second layer 122L2 toward the lower part of the second layer 122L2.

A desirable example of the specific property of the volume resistance value ($\Omega \cdot cm$) of the first layer 122L1, made of a high-photoconductivity alignment material, is a photoconductivity in which the volume resistance value changes about $10^{14}$ to $10^{15}$ ($\Omega \cdot cm$) under no light irradiation, to about $10^{12}$ to $10^{13}$ ($\Omega \cdot cm$) under irradiation with light equivalent to light emitted from the backlight. Referring to a change in the volume resistance value between the ON and OFF states of light, i.e., between a condition under light irradiation and a condition under no light irradiation, desired is a photoconductivity in which the volume resistance value during the ON state changes to about $1/10$ to $1/10^2$, to at least not greater than $1/10$ of the volume resistance value during the OFF state. The first layer 122L1 that satisfies these ranges can be obtained by using the aforementioned polyimide, which is formed by processing, as a precursor, a polyamide acid derived from a pyromellitic dianhydride (PMDA) into an imide.

Referring to the second layer 122L2, made of an alignment material having a photoalignment capability, there is particularly no need for the volume resistance value per se to be low in either of the two cases: the condition under no light irradiation and the condition under light irradiation, because an emphasis is placed on its alignment capability. Rather, high resistance is desired, that is, it is desired that the volume resistance value per se be relatively high in order not to reduce a voltage holding ratio (VHR). Accordingly, with regard to the specific property of the volume resistance value ($\Omega \cdot cm$) of the second layer 122L2, the volume resistance value is less subject to change depending on the ON and OFF states of light, that is, the second layer 122L2 has no photoconductivity. Such a volume resistance value is about $10^{13}$ ($\Omega \cdot cm$) or more under irradiation with light equivalent to light emitted from the backlight, and is about $10^{15}$ ($\Omega \cdot cm$) or more under no light irradiation. A high-resistance alignment film can be basically obtained by selecting, for instance, a suitable condition about 70% or more in the aforementioned polyimide, formed by processing a polyamide acid alkyl ester as a precursor into an imide. The second layer 122L2 that satisfies these ranges can be consequently obtained.

As earlier described, the alignment film 122 is in detail configured such that the alignment agent forming the lower first layer 122L1 and the alignment agent forming the upper second layer 122L2 are distributed while mixing to each other to a certain extent at their boundary, and are thus not clearly separated into upper and lower layers. In addition, the alignment film 122 has a lower layer in which the concentration of the alignment agent forming the first layer 122L1 is high and has such a gradient as to decrease gradually from the lower part of the first layer 122L1 toward the upper part of the first layer 122L1. The alignment film 122 also has an upper layer in which the concentration of the alignment agent forming the second layer 122L2 is high and has such a gradient as to decrease gradually from the upper part of the second layer 122L2 toward the lower part of the second layer 122L2. Thus, with regard to the volume resistance value in the ON and Off states of light and the photoconductivity as well, a gradual change from the aforementioned property of the first layer 122L1 to the aforementioned property of the second layer 122L2 is seen from the lower layer of the alignment film 122 to the upper layer of the alignment film 122.

The forgoing has described the alignment film 122 disposed on the counter substrate 120. The alignment film 112 on the array substrate 110 is configured similarly. That is, the alignment film 112 is composed of a phase-separation alignment film; in addition, the alignment film 112 has a lower layer made of a high-photoconductivity alignment material, and has an upper layer made of an alignment material having a photoalignment capability. The array substrate 110 is provided with various wires and various conductive films, such as electrodes, and thus does not seriously have charge residues. For this reason, the alignment film 112 on the array substrate 110 may be composed of a single-layer film made of an alignment material having a photoalignment capability.

<Process Steps for Manufacturing Liquid Crystal Display>

Figure 4:
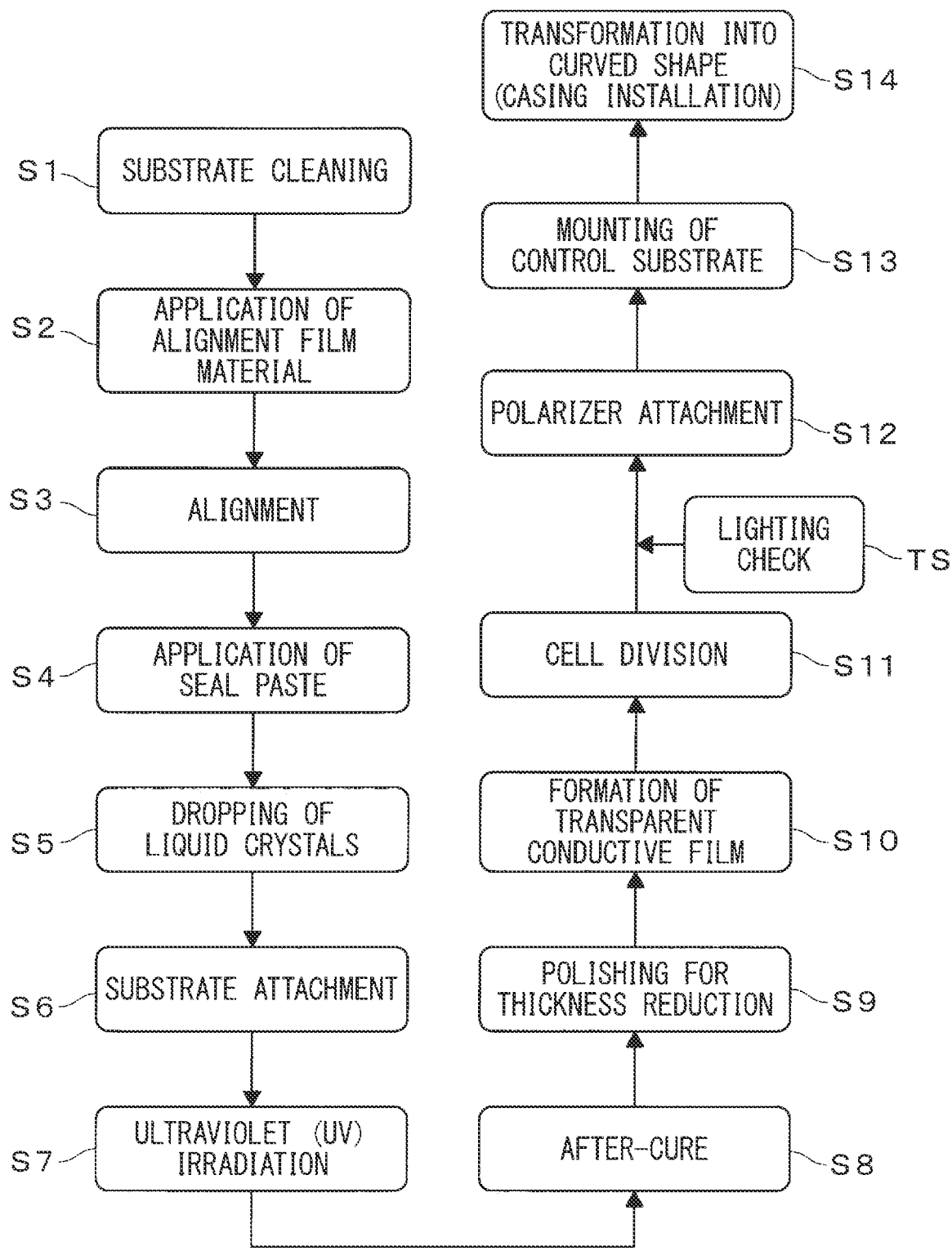
FIG. 4 is a flowchart showing process steps for panel assembly included in a method for manufacturing the liquid crystal panel according to the first preferred embodiment of the present invention.

A method for manufacturing the liquid crystal display according to the first preferred embodiment of the present invention will be described. With reference to the flowchart of FIG. 4, the following describes process steps for manufacturing the liquid crystal display 10 that includes the liquid crystal panel 100 having the aforementioned configuration. A typical liquid crystal panel is commonly manufactured by cutting a single liquid crystal panel out of a mother glass substrate larger than the final shape of the liquid crystal panel or by cutting multiple liquid crystal panels out of such a mother glass substrate (this cutting is also called multi-piece cutting). The process steps from Steps S1 to S10 (to some midpoint of Step S11) in FIG. 4 are performed using mother glass substrates.

The first step is substrate preparation. Wires, electrodes, light shielding layer, and various insulating films are formed onto a mother glass substrate that corresponds to a mother array substrate on which the array substrate 110 is to be imposed, and onto a mother glass substrate that corresponds to a mother counter substrate on which the counter substrate 120 is to be imposed. That is, components, such as the gate wires, source wires, TFTs 115, insulating film 116, pixel electrodes 113 and counter electrodes 114, are formed onto the mother glass substrate that corresponds to the mother array substrate. This component formation, which is similar to a method for producing an array substrate in a typical liquid crystal panel in lateral-electric-field mode, will not be elaborated upon here. In addition, components, such as the color filters 123, BM 124, OC layer 125, and columnar spacers described with reference to FIG. 1 or 3, are formed onto the mother glass substrate that corresponds to the mother counter substrate. This component formation, which is similar to a method for producing a color filter substrate (i.e., a counter substrate) in a typical liquid crystal panel, will not be elaborated upon here.

In a typical liquid crystal panel in lateral-electric-field mode, the antistatic transparent conductive layer 126 described with reference to FIG. 1 is often formed when the mother counter substrate is prepared. The first preferred embodiment, by contrast, employs the following process steps with regard to the mother glass substrates forming the mother array substrate and the mother counter substrate, in order to facilitate the manufacture process. That is, the mother array substrate and the mother counter substrate are brought into attachment with the sealant 130 to form a mother cell substrate; thereafter, a process step of polishing for thickness reduction (i.e., a sliming step) is performed in which the thicknesses of the mother counter substrate and mother array substrate are reduced to about less than 0.2 mm; thereafter, transparent conductive films, such as an ITO film that serves as the transparent conductive layer 126, are formed. The details of each process step will be described later on. The process step of preparing the mother counter substrate thus omits a process step of forming transparent conductive films, such as an ITO film.

The aforementioned preparation of the mother array substrate and mother counter substrate is followed by Step S1, i.e., substrate cleaning. The mother array substrate and the mother counter substrate after prepared undergo substrate cleaning.

Step S2, i.e., application of an alignment film material, is next performed. Each of the mother array substrate and the mother counter substrate undergoes application of an alignment film material onto one of its surfaces. In this process step, an alignment film material made of an organic material (e.g., a polyimide) is applied, by transfer using a flexography method, onto the main surfaces of the mother array substrate and mother counter substrate facing each other. To be more specific, a transfer roller coated with an alignment film material is moved in a predetermined transfer direction, whereby the alignment film material is transferred and thus applied onto a predetermined application region on the surface of the mother counter substrate.

In the first preferred embodiment, an example of the alignment film material that is transferred and thus applied at this time is a mixed material consisting of a photoalignment film material formed by processing a polyamide acid alkyl ester that mainly serves as a raw material of the upper layer the alignment film into an imide, and consisting of a photoconductive alignment film material composed of a polyamide acid precursor derived from a pyromellitic dianhydride (PMDA) that mainly serves as a raw material of the lower layer of the alignment film. When compared to the polyamide acid alkyl ester forming the photoalignment film material, the polyamide acid derived from the PMDA easily harmonizes with the ITO film forming the counter electrodes 114 disposed on the surface of the mother array substrate, and with the transparent resin film forming the OC layer 125 disposed on the surface of the mother counter substrate. Hence, after application, the polyamide acid derived from the PMDA and the rest of the applied mixed material are always located in the lower layer and the upper layer, respectively, by leveling effect. This establishes "phase-separation".

The alignment film material that has been formed in this way then undergoes heating at about 200° C. using a hotplate oven. Accordingly, the photoalignment film material (i.e., upper layer established by the phase-separation) formed by processing, into an imide, the polyamide acid alkyl ester is turned into a polyimide, and the polyamide acid (i.e., lower layer established by the phase-separation) derived from PMDA is turned into a polyimide. Furthermore, a solvent constituent evaporates to be dried.

At least the lower layer of the alignment film formed in this way is made of a photoconductive material containing a polyimide formed by, as a precursor, a polyamide acid derived from a PMDA into an imide. Accordingly, the alignment film is formed that is made of a material having a photoconductivity in which the volume resistance value of the alignment film under light irradiation changes to at least not greater than 1/10 of the volume resistance value of the alignment film under no light irradiation. Step S2, i.e., application of an alignment film material, includes up to this point of process step.

The next process step is Step S3, i.e., alignment. The surfaces of the alignment film materials undergoes alignment by performing an alignment process on the mother array substrate and mother counter substrate through, for instance, rubbing and photo-alignment where predetermined beams of polarized light are emitted, thus forming the alignment films 112 and 122. In the first preferred embodiment, since the alignment films 112 and 122 are both formed of photoalignment films, a photoalignment process is selected as an alignment process in Step S3.

The next process step is Step S4 i.e., application of a seal paste using a dispenser having a nozzle. In this process step, an adhesive paste that serves as the sealant 130 is discharged from the nozzle and is applied onto the main surface of the mother array substrate or mother counter substrate. The paste is applied in the form of a pattern that surrounds the display region of the liquid crystal panel, and forms the sealant 130.

The next process step is Step S5, i.e., dropping of liquid crystals, in which one of the substrates where the pattern of the paste is formed undergoes dropping of a liquid crystal material into the region surrounded by the pattern of the paste. The subsequent process step is Step S6, i.e., substrate attachment, in which the mother array substrate and the mother counter substrate are brought into attachment to each other in a vacuum to form a mother cell substrate. The next step is Step S7, i.e., ultraviolet (UV) irradiation, in which he mother cell substrate is irradiated with ultraviolet rays to temporarily cure the paste, which serves as the sealant 130. The subsequent step is Step S8, i.e., after-cure by heating, in which the paste is completely cured to obtain the cured sealant 130.

Next, Step S9, i.e., polishing for thickness reduction (i.e., a slimming step) is performed to obtain a curved liquid crystal display. In order to facilitate curving processing, the glass substrate 111 and the glass substrate 121 are reduced to be thin plates. In this process step, each of the mother glass substrates, which constitute the outside of the mother cell substrate, undergoes surface reduction through, for instance, a chemical polishing method with a chemical solution and/or through a physical polishing method of scraping with a polisher. Herein, the mother glass substrates that are about 0.5 mm thick undergo polishing to reduce the thickness of the mother counter substrate and mother array substrate to about 0.15 mm (e.g., the thickness is regulated within a center value of 0.15 mm and tolerance of ±20%).

The subsequent process step is Step S10, i.e., formation of a transparent conductive film. In this process step, transparent conductive films, such as an ITO film that is to be the antistatic transparent conductive layer 126 that is placed on the outer surface of the counter substrate 120 when the liquid crystal panel 100 is completed, are formed through sputtering or other methods, particularly onto the cell outer surface of the mother counter substrate whose thickness has been reduced to about less than 0.2 mm as a result of the polishing for thickness reduction in Step S9.

The next process step is Step S11, i.e., cell division, in which the mother cell substrate is cut along a scribe line into separate liquid crystal cells. The liquid crystal cells separated in this way undergo Step TS individually, i.e., lighting check. Step TS includes a step of lighting up the backlight for use in lighting check disposed behind the liquid crystal panel in the form of a liquid crystal cell, and a step of displaying a test screen with the backlight remaining on, to check a display state with observer's eyes and/or an image captured by a camera.

Figure 5:
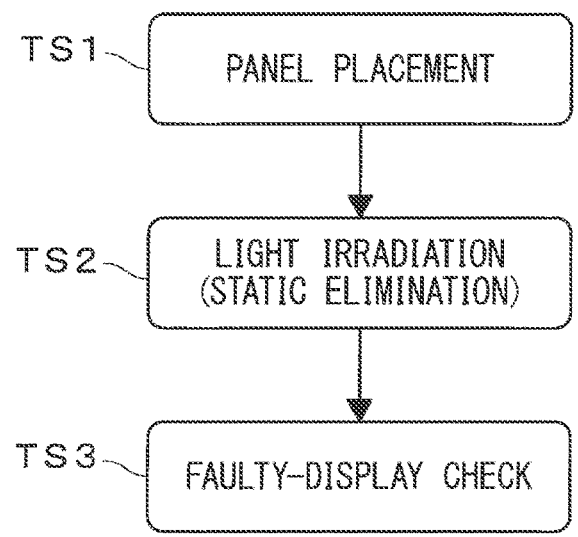
FIG. 5 is a flowchart showing individual process steps included in a lighting check step included in the method for manufacturing the liquid crystal panel according to the first preferred embodiment of the present invention.
Figure 6:
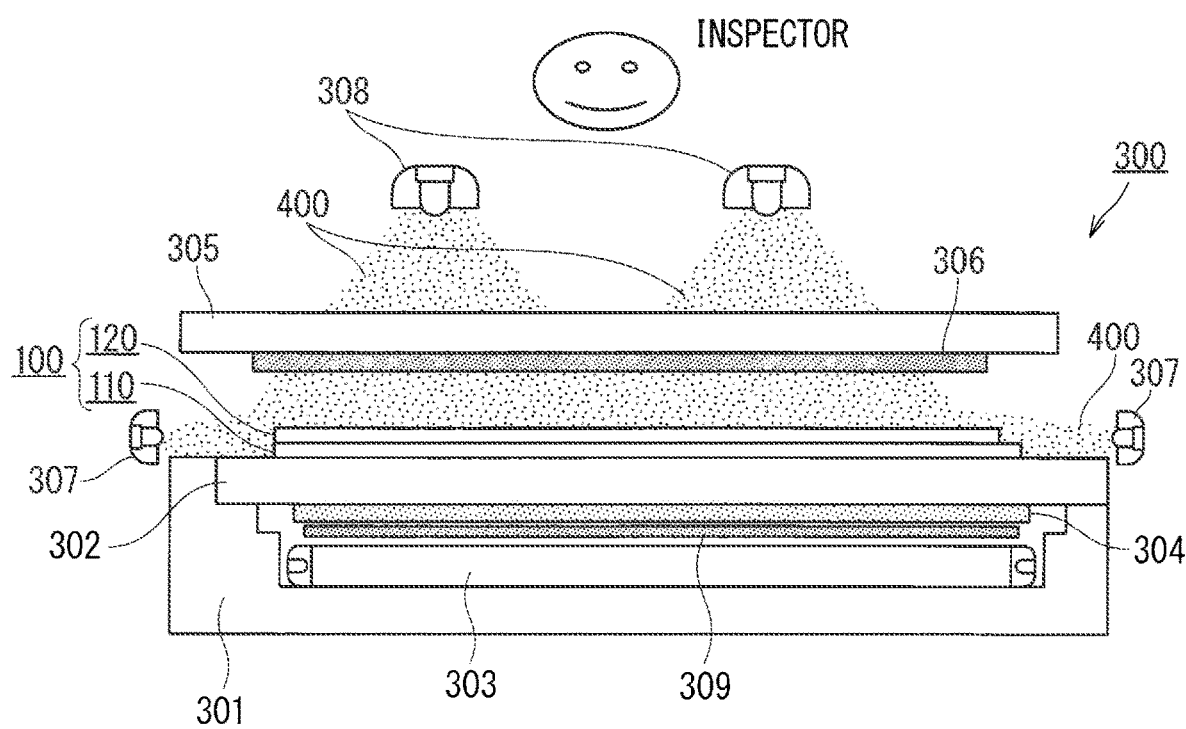
FIG. 6 schematically illustrates a lighting check system that is used in the lighting check step according to the first preferred embodiment of the present invention.

This lighting check in Step TS, which is characteristic to the manufacture process in the present invention, will be detailed with reference to the flowchart of FIG. 5 showing individual process steps in the lighting check step, and to the diagram of FIG. 6 illustrating the configuration of a lighting check system.

With reference to FIG. 6, the following first details the configuration of a lighting check system 300 that is used in the lighting check in Step TS. The lighting check system 300 has a stage for placing the liquid crystal panel (liquid crystal cell) 100, which is a workpiece to be checked. As shown in the drawing, the stage includes a stage casing 301, a transparent stage plate 302 for placing the liquid crystal panel (liquid crystal cell) 100, and a backlight 303 that serves as a light source for use in check disposed behind the transparent stage plate 302.

Since the liquid crystal panel (liquid crystal cell) 100 before attachment of the polarizers 141 and 142, which are included in a complete version of the liquid crystal panel 100, is lit up and displayed, polarizers for use in check are placed near the lighting check system 300. To be specific, a backside polarizer 304 is attached to the back surface of the transparent stage plate 302. Further, a front transparent plate 305 is placed in front of the liquid crystal panel (liquid crystal cell) 100. Still further, a front polarizer 306 is attached to the front transparent plate 305. It is noted that the transparent stage plate 302 and the front transparent plate 305 each can be composed of a transparent plate. Examples of such transparent plate usable herein include a glass plate and an acrylic plate.

The lighting check system 300 in the first preferred embodiment is used to achieve a function of eliminating static electricity accumulating in the liquid crystal panel (liquid crystal cell) 100. For this reason, the lighting check system 300 includes a characteristic component, that is, an auxiliary light source, in addition to the backlight 303 included in a typical lighting check system. The auxiliary light source is provided to achieve a function of static elimination. The auxiliary light source includes light sources, i.e., side auxiliary lights 307, on its sides so that the liquid crystal panel (liquid crystal cell) 100 on the stage is irradiated with light from the side surfaces of the liquid crystal panel 100. The auxiliary light source also includes a light source above the stage, i.e., front auxiliary lights 308, so that the liquid crystal panel (liquid crystal cell) 100 on the stage is irradiated with light beams from the upper surface of the liquid crystal panel 100.

The drawing schematically shows that the liquid crystal panel (liquid crystal cell) 100 on the stage is irradiated with irradiation light 400 from the side auxiliary lights 307 and the front auxiliary lights 308. In addition, the drawing schematically shows the position of an inspector above the liquid crystal panel (liquid crystal cell) 100. In the drawing, the distance between the inspector's position and the liquid crystal panel (liquid crystal cell) 100, the relative relationship in distance between the front auxiliary lights 308 and the liquid crystal panel (liquid crystal cell) 100, and other things are not exact.

The lighting check system 300 in the first preferred embodiment includes another characteristic component, i.e., an optical film 309 disposed between the backlight 303 and the liquid crystal panel (liquid crystal cell) 100, herein, between the backlight 303 and the backside polarizer 304. The optical film 309 regulates the dispersion properties of light emitted from the backlight 303. The optical film 309 is provided with the aim of diffusing emitted light also in directions other than a direction perpendicular to the surface of the backlight 303 and casting the emitted light on the liquid crystal panel (liquid crystal cell) 100 so that the emitted light is sufficiently incident on the alignment film 122 located in a portion interposed between the BM 124 of the counter substrate 120 of the liquid crystal panel (liquid crystal cell) 100 and each light shielding layer of the array substrate 110 of the liquid crystal panel (liquid crystal cell) 100. Examples of the optical film 309 usable herein include a lens sheet and a prism sheet.

As is the case with a typical lighting check system, the lighting check system 300 includes a signal application means (not shown) for applying an electric signal for displaying a test display screen onto the liquid crystal panel (liquid crystal cell) 100. The signal application means has probe pins and other things that are used to apply a signal and connected to the signal terminals 117. In some preferred embodiments, the stage on which the liquid crystal panel (liquid crystal cell) 100 is placed may be provided with a movable mechanism configured to move the liquid crystal panel (liquid crystal cell) 100 between a position for dismounting the liquid crystal panel (liquid crystal cell) 100 and a checking position located below the front transparent plate 305.

Each process step performed in the lighting check process in Step TS will be next described with reference to the flowchart of FIG. 5. First, in Step TS1, i.e., panel placement, the liquid crystal panel (liquid crystal cell) 100 is placed onto the stage, and the probe pins and other things for applying a signal are properly connected to the signal terminals 117 of the liquid crystal panel (liquid crystal cell) 100. Furthermore, the liquid crystal panel 100 moves to a location below the front transparent plate 305 appropriately. The liquid crystal panel (liquid crystal cell) 100 is accordingly mounted onto the stage as shown in FIG. 6, and is placed below the front transparent plate 305, and is placed at a location interposed between the backside polarizer 304 and the front polarizer 306. As shown in the drawing, the liquid crystal panel (liquid crystal cell) 100 is placed onto the stage in such a manner that, as is the case with a typical lighting check, the counter substrate 120 is in the upper part and the array substrate 110 is in the lower part.

The subsequent process step is Step TS2, i.e., light irradiation, that functions as a static elimination process in which the liquid crystal panel (liquid crystal cell) 100 is irradiated with light from below, side, and above by lighting up the backlight 303 with the liquid crystal display (liquid crystal cell) 100 disposed as shown in FIG. 6, and further by lighting up the side auxiliary lights 307 and the front auxiliary lights 308. During the light irradiation in Step TS2, the alignment film 122 on the inner surface of the counter substrate 120 of the liquid crystal panel (liquid crystal cell) 100 and the alignment film 112 on the inner surface of the array substrate 110 of the liquid crystal panel (liquid crystal cell) 100 are irradiated with light emitted from these light sources.

In particular, the optical film 309, which regulates the dispersion properties of the light emitted from the side auxiliary lights 307 disposed on the sides, and the dispersion properties of the light emitted from the backlight 303, functions, whereby the alignment films 122 and 112 in a portion interposed between the light shielding layers on the array substrate 110 and counter substrate 120 (i.e., the BM 124 on the counter substrate 120 and each light shielding layer on the array substrate 110) are also irradiated with light effectively. As a result, the volume resistance value of the first layer 122L1, which is disposed in a lower position and made of a high-photoconductivity alignment material that is used for the alignment film 122, or the volume resistance value of a similar alignment film that is disposed in a lower position and made of a high-photoconductivity alignment material that is used for the alignment film 112 changes to about $10^{12}$ to $10^{13}$ ($\Omega \cdot cm$), whereby the resistances of these alignment film materials are greatly lowered.

The state where the alignment film 122 and the alignment film 112 have their greatly lowered resistances in the lower parts remains as it is during the light irradiation in Step TS2. During this process, electric charges resulting from the static electricity occurring in the inner surface of the counter substrate 120 are mainly eliminated. In other words, the light irradiation in Step TS2 serves as a process by which a function of eliminating static electricity from the surface of the counter substrate 120. Here, the light irradiation in Step TS2 needs to be performed for a predetermined time period that is set by reflecting, as a guide, a time period sufficient to achieve a function of static elimination.

The liquid crystal panel (liquid crystal cell) 100 that has undergone static elimination by performing the light irradiation in Step TS2, subsequently undergoes a faulty-display check process in Step TS3, that corresponds to a typical lighting check process. Step TS3 is a process step of checking for a failure in a predetermined display state by checking the display state by the use of observer's eyes and/or an image captured by a camera, with the backlight 303 remaining on and with a test screen remaining displayed. In the faulty-display check process in Step TS3, a check for a point defect failure (including a bright spot failure) and/or for a line defect failure resulting from a disconnection between wires and/or a short-circuit, a check for display unevenness, and other checks are sequentially performed. These are check items in a typical process step of lighting check. Through these sequential process steps, the lighting check in Step TS is completed.

The foregoing example of the lighting check in Step TS and lighting check system 300 has described that in the liquid crystal panel (liquid crystal cell) 100 in lateral-electric-field mode in particular, both a method that uses a configuration where the optical film 309 is disposed on the backlight 303 and a method that uses a configuration where the side auxiliary lights 307, which cast light upon the liquid crystal panel (liquid crystal cell) 100 placed on the stage from its side surfaces, are used together so that emitted light is effectively incident on the alignment film 122 of the counter substrate 120 that causes a display failure and also on a portion interposed between the BM 124 and each light shielding layer of the array substrate 110, or so that the time of the light irradiation in Step TS2, i.e., a time sufficient to achieve a function of static elimination, is shortened, thus reducing the tact time of the light irradiation in Step TS2 and the tact time of the lighting check in Step TS.

Nevertheless, the alignment film 122 in the portion interposed between the BM 124 and each light shielding layer of the array substrate 110 can be irradiated with light effectively to some extent, even when one of these methods are selected. Moreover, the alignment film 122 in the portion interposed between the BM 124 and each light shielding layer of the array substrate 110 can be irradiated with light effectively to some extent, even when both methods are omitted, and a method is used in which light emitted from the backlight 303 for use in lighting check is directly casted upon the liquid crystal panel (liquid crystal cell) 100 from the array substrate 110.

This is because, when compared to the BM 124 on the counter substrate 120, each light shielding layer of the array substrate 110 is narrow in width, and is furthermore located in a position that is away, via the liquid crystal layer 140, from the alignment film 122 of the counter substrate 120 that needs to be irradiated with light. For these reasons, irradiation from the array substrate 110 causes the light dispersed and emitted appropriately from the backlight 303 to be also somewhat casted upon the alignment film 122 in the portion interposed between the BM 124 and each light shielding layer of the array substrate 110.

The foregoing example of the lighting check in Step TS and lighting check system 300 has described a configuration where the front auxiliary lights 308 are disposed above the stage as well so that the liquid crystal panel (liquid crystal cell) 100 on the stage is irradiated with light also from above, so that the time of the light irradiation in Step TS2, i.e., a time sufficient to achieve a function of static elimination, is shortened, thus reducing the tact time of the light irradiation in Step TS2 and the tact time of the lighting check in Step TS. Nevertheless, in the irradiation of the alignment film 122 in the portion interposed between the BM 124 and each light shielding layer of the array substrate array substrate 110, it is effective to cast light using the backlight 303 and cast light using the side auxiliary lights 307 from the side surfaces, and the irradiation from the front auxiliary lights 308 is auxiliary. Accordingly, the provision of the front auxiliary lights 308 and the irradiation using the front auxiliary lights 308 may be omitted.

The foregoing has described an instance where the optical film 309 is configured to have a particular dispersion property, such as a lens sheet or a prism sheet. Such a configuration is effective when the light irradiation in Step TS2, which functions as a process of static elimination, is performed. However, when the faulty-display check in Step TS3 is performed, this configuration can adversely affect the direction of irradiation using the backlight 303 for use in lighting check. For the purpose that the optical film 309 does not adversely affect the direction of irradiation using the backlight 303 for used in lighting check, the optical film 309 needs to be detachable, and the optical film 309 needs to be detached from between the backlight 303 and the backside polarizer 304 when the faulty-display check in Step TS3 is performed. An inspector may detach the optical film 309. Alternatively, a detachment mechanism may be provided that automatically detaches the optical film 309.

In an alternative example method, a dispersion liquid crystal sheet having a laminated structure with polymer dispersed liquid crystals (PDLCs) held between two transparent plastic sheets that faces each other and each have a surface provided with a transparent electrode, is used as the optical film 309 so that the dispersion property of the optical film 309 is variable. The dispersion liquid crystal sheet can select between two kinds of dispersion property, i.e., between dispersion and non-dispersion, by turning on/off a voltage that is applied between the transparent electrodes disposed on the two transparent plastic sheets. In this case as well, the voltage across the dispersion liquid crystal sheet needs to be turned off (non-dispersion) when the light irradiation in Step TS2, which functions as a process of static elimination, is performed, and the voltage across the dispersion liquid crystal sheet needs to be turned on (i.e., dispersion) when the faulty-display check in Step TS3 is performed.

As described above, the first preferred embodiment has described, by way of example, that in the light irradiation in Step TS2, light irradiation from the array substrate 110 by the use of the backlight 303 of the lighting check system 300 is performed before the faulty-display check in Step TS3 is started, and that the light irradiation in Step TS2, i.e., the light irradiation from the array substrate 110 by the use of the backlight 303, is performed for a predetermined time period that is set by reflecting, as a guide, a time period sufficient to achieve a function of static elimination. Although the time sufficient to achieve a function of static elimination more or less varies depending on the degree of electric charges that should be eliminated, a predetermined time period suitable to achieve a function of static elimination needs to be set in accordance with the degree of electric charges in an adopted process.

When this established predetermined time period needs to be long to some extent and needs to be managed precisely, the lighting check system 300 may have, for instance, a clock function and a function of, after a lapse of a predetermined time period, sounding an alarm indicating that the faulty-display check in Step TS3 should be started, so that the light irradiation in Step TS2 is performed for the established predetermined time period without fail after the panel placement in Step TS1 is performed and before the faulty-display check in Step TS3 is started.

When the established predetermined time period is not so long, some checks that are less affected by a buildup of static electricity among the check items executed in the lighting check may be executed first, such as a check for a line defect failure resulting from a disconnection between wires and/or a short-circuit, and the light irradiation in Step TS2 by lighting-up for the predetermined time period using the backlight 303 may be completed during the execution of these checks, and then a check for a point defect failure and/or display unevenness failure, which is easily affected by a buildup of static electricity, may be executed finally. Such a lighting check achieves the effect of the first preferred embodiment by only reviewing the order of check items in a conventional process step of lighting check.

In some cases, a time for performing the light irradiation in Step TS2 cannot be allotted sufficiently because of a tact time. In other cases, because of a highly buildup of static electricity and other reasons, bright-spot defects and/or display unevenness resulting from static electricity are detected at a certain ratio in the faulty-display check in Step TS3 even after the light irradiation in Step TS2, thus generating products evaluated as faulty products. In these cases as well, performing the light irradiation in Step TS2 again and/or performing the light irradiation in Step TS2 for an appropriately longer time period on the products evaluated as faulty products successfully enables electric charges remaining in the inner surface of the counter substrate 120 due to static electricity to be eliminated, thereby repairing these faulty products.

As such, a process step of performing the light irradiation in Step TS2 and the faulty-display check in Step TS3 again on products evaluated as faulty products may be added to the faulty-display check in Step TS3. Doing so does not contribute to the enhancement of first run rate, but can avoid a failure occurrence ultimately and can further improve yield.

When bright spot defects and/or display unevenness resulting from static electricity are not recovered sufficiently through the light irradiation in Step TS2, in particular, when the recovery of display unevenness resulting from static electricity is slightly insufficient, a display state becomes unstable, thus concluding in many cases that this display unevenness clearly results from static electricity. Accordingly, if such a case occurs, a product is not evaluated as a faulty product right away in the faulty-display check in Step TS3; rather, the product is observed for a predetermined time period, e.g., about one minute or two minutes, with a check target placed on the stage, that is, with the check target irradiated with light from the array substrate 110 by the use of the backlight 303 as is the case with the light irradiation in Step TS2. In other words, the product undergoes a process equal to performing of the light irradiation in Step TS2 longer than the predetermined time period. Performing such a process overcomes the remainder of the elimination of electric charges resulting from static electricity, thereby possibly achieve a normal display operation.

As such, when such a phenomenon in which a display state becomes unstable occurs in the faulty-display check in Step TS3, each check on a check item that is a check for a predetermined failure in the display state and needs to be performed in the faulty-display check in Step TS3 may be performed after a lapse of a predetermined observation time period until the display state becomes stable with the inspection target remaining on the stage. Doing so more or less increases the tact time of the lighting check in Step TS, only when a product that has not been sufficiently recovered from a bright-spot defect and/or display unevenness resulting from static electricity through the light irradiation in Step TS2 undergoes a check, but avoids a failure occurrence ultimately without lowering first run rate, thereby improving yield.

As described above, after the lighting check in Step TS is performed, a product evaluated as a non-defective product in each check item in the faulty-display check in Step TS3 subsequently undergoes Step S12, i.e., polarizer attachment, Step S13, i.e., mounting of a control substrate, and other process steps. A series of these manufacture process steps are accordingly completed. This completes the liquid crystal panel 100 shown in FIGS. 1 and 2.

Finally, in Step S14, i.e., a process step of transformation into a curved shape (and a process step of casing installation), the liquid crystal panel 100 with the array substrate 110 and counter substrate 120 transformed to be curved is attached to the curved surface of the curved transparent protector 101, which is made from a transparent plate having a desired curved shape, via the transparent adhesive sheet 102. The liquid crystal panel 100 is further installed and held in the casing properly, with a curved backlight unit and other components disposed on the backside of the liquid crystal panel 100 via an optical sheet so as to face the liquid crystal panel 100. Through the aforementioned process steps, the curved liquid crystal display 10 that includes the liquid crystal panel 100 having the curved display surface 200 is completed.

The following describes functions achieved by the curved liquid crystal display according to the first preferred embodiment. The curved liquid crystal display according to the first preferred embodiment is manufactured through the aforementioned slimming step, as is the case with a typical curved liquid crystal display. Thus, the mother counter substrate is not provided with transparent conductive films, such as an ITO film. Accordingly, at least in Step S1 (i.e., substrate cleaning) to Step S9 (i.e., polishing for thickness reduction), which are performed before Step S10 (i.e., formation of transparent conductive films, such as an ITO film), static electricity that occurs in each process step excites electric charges in the inside of the liquid crystal cell, particularly, in the surface of the mother counter substrate that is not provided with an electrode layer when a liquid crystal display in lateral-electric-field mode is employed, the surface being adjacent to the liquid crystal layer.

In addition, the electric charges (a buildup of static electricity) excited in the surface of the mother counter substrate adjacent to the liquid crystal layer are not normally eliminated after the formation of transparent conductive films (e.g., an ITO film) outside the cell in Step S10 (i.e., formation of transparent conductive films) when an alignment film (polyamide acid) is used that has a high resistance in order to enhance reliability and optical properties. Accordingly, when a high-resistance alignment film is assumed to be used in a typical curved liquid crystal display in lateral-electric-field mode, its liquid crystal panel is evaluated as faulty display because of display unevenness visually found in a lighting check process. This can cause a decrease in yield.

In particular, a curved liquid crystal undergoes a slimming step in a lighting check process to reduce the thickness of the glass substrate 121, constituting the counter substrate 120, to about less than 0.2 mm, in the first preferred embodiment, to about 0.15 mm. Such a reduction in thickness increases the capacity between the excited electric charges in the surface adjacent to the liquid crystal layer and the antistatic transparent conductive layer 126, which faces the liquid crystal layer via the glass substrate 121 whose thickness has been reduced to about less than 0.2 mm. Consequently, the buildup of static electricity in the surface adjacent to the liquid crystal layer increases an electric field acting on the liquid crystal layer 140. Alternatively, since the capacity is larger, more electric charges accumulate, and the electric charges are difficult to eliminate once a buildup of static electricity occurs. That is, even if the same degree of buildup of static electricity occurs, when a typical curved liquid crystal display after a slimming step at the time of a lighting check process is particularly assumed, a bright-spot defect and/or display unevenness can become conspicuous.

The curved liquid crystal display and method for manufacturing the curved liquid crystal display according to the first preferred embodiment have features that are not included, particularly in a typical liquid crystal display and method for manufacturing the typical liquid crystal display. One of the features of the curved liquid crystal display and method for manufacturing the curved liquid crystal display according to the first preferred embodiment is that the alignment film 122 on the counter substrate 120 particularly includes the first layer 122L1 disposed on the lower side of the alignment film 122 and is made of a high-photoconductivity alignment material. The other feature is that a process of performing light irradiation from outside after the substrate attachment step includes performing the lighting check in Step TS, particularly includes performing the light irradiation in Step TS2. The light irradiation in Step TS2 is included in the lighting check in Step TS and is a process step of light irradiation from the array substrate for a predetermined time period (i.e., a time period sufficient to achieve a function of static elimination) by the use of the backlight unit for use in lighting check.

As a result of the aforementioned features of the curved liquid crystal display and method for manufacturing the curved liquid crystal display, the resistance of the first layer 122L1, included in the alignment film 122 and made of a high-photoconductivity alignment material, is greatly reduced. This reduction allows electric charges resulting from static electricity and occurring in the surface of the counter substrate 120 to be eliminated. That is, the light irradiation in Step TS2 serves as a process that achieves a function of eliminating static electricity from the surface of the counter substrate 120. This enables a defect in the display state (e.g., a bright-spot defect and/or display unevenness resulting from the static electricity) to be less seen in the subsequent process step, i.e., faulty-display check in Step TS3.

In some cases, the electric charges gradually go away over a certain period of time, whereby the liquid crystal panel recovers from the display unevenness caused by the buildup of static electricity. Hence, a product exhibiting display unevenness is kept as-is for several days, followed by undergoing a lighting check process again to be evaluated as being not a faulty product in some cases. However, no detection of defects (e.g., a bright-spot defect and/or display unevenness resulting from the static electricity) at the time of the lighting check in Step TS at least avoids temporary check fallout, thereby contributing to a rise in first run rate.

Conversely, a product evaluated as a faulty product can be repaired as well by, as earlier described, undergoing Step TS3 (i.e., faulty-display check) included in Step TS (i.e., lighting check), followed by undergoing Step TS2 (i.e., light irradiation) again, which is a process step of light irradiation from the array substrate 110. In other words, although not contributing to a rise in first run rate, performing light irradiation from the array substrate 110 at any one of the stages after the substrate attachment step at least avoids a failure occurrence ultimately, thereby contributing to an improvement in yield.

In the curved liquid crystal display 10 according to the first preferred embodiment operating for display, the upper second layer 122L2 in contact with the liquid crystal layer 140 has a volume resistance value of about $10^{15}$ ($\Omega \cdot cm$) or more, which is relatively high, even while being irradiated with light from the backlight. Hence, electric charges cannot move via the liquid crystal layer 140.

In addition, although the resistance of the first layer 122L1, disposed in the lower part via the second layer 122L2, is reduced to about $10^{12}$ to $10^{13}$ ($\Omega \cdot cm$) at a location irradiated with light from the backlight, regions for forming components, such as the gate wires, source wires, and TFTs 115 disposed on the array substrate 110, become light shielding layers. The first layer 122L1 positioned at a location where the first layer 122L1 overlaps the light shielding layers in plan view is thus not irradiated with sufficient light, and thus still has a relatively high resistance of about $10^{14}$ to $10^{15}$ ($\Omega \cdot cm$). Moreover, the locations where the light shielding layers are formed are basically formed in the shape of a lattice. Likewise, the high-resistance region of the first layer 122L1, which is the location overlapping, in plan view, the locations where the light shielding layers are formed, is formed in the shape of a lattice. Thus, a region of the first layer 122L1 whose resistance is reduced by irradiation with light emitted from the backlight is provided so as to be partitioned in plan view.

Accordingly, a path that leads to the periphery of the liquid crystal panel via the liquid crystal layer 140 and via the first layer 122L1 and second layer 122L2 of the alignment film 122 has a considerably high resistance. Electric charges that accumulates in order to hold a display potential for driving the liquid crystal layer 140 consequently does not leak freely through the path during the display operation. As such, the curved liquid crystal display according to the first preferred embodiment, when operating for display, causes no decrease in voltage holding ratio (VHR) that could be a problem in particular.

As described above, the curved liquid crystal display according to the first preferred embodiment is a liquid crystal display in lateral-electric-field mode that is manufactured through a process that includes a process step of polishing for thickness reduction (i.e., a slimming step). Light from the backlight is used at the time of a lighting check process to reduce the resistance of the alignment film, thus eliminating electric charges occurring in the surface of the counter substrate due to static electricity. This enables the liquid crystal panel to undergo a stable lighting check without being affected by a buildup of static electricity. This, alternatively, enables improvement of defects in the display state, such as a bright-spot defect and/or display unevenness resulting from static electricity. In particular, although the curved liquid crystal display is apt to exhibit a bright-spot defect and/or display unevenness resulting from static electricity, the curved liquid crystal display, which has glass substrates processed into thin plates that are less than 0.2 mm thick, less causes defects in its display state, such as a bright-spot defect and/or display unevenness resulting from the static electricity. Alternatively, such a configuration avoids temporary check fallout, thereby raising first run rate. In addition, when the curved liquid crystal display is operated for display, such a configuration causes no decrease in voltage holding ratio (VHR) that could be a problem in particular. Display quality consequently does not deteriorate due to a decrease in the voltage holding ratio (VHR) in particular. In addition, such a configuration eliminates the need for providing a dummy backside ITO (i.e., an antistatic transparent conductive layer), thereby achieving the aforementioned effects without a conspicuous cost increase.

Second Preferred Embodiment

Figure 7:
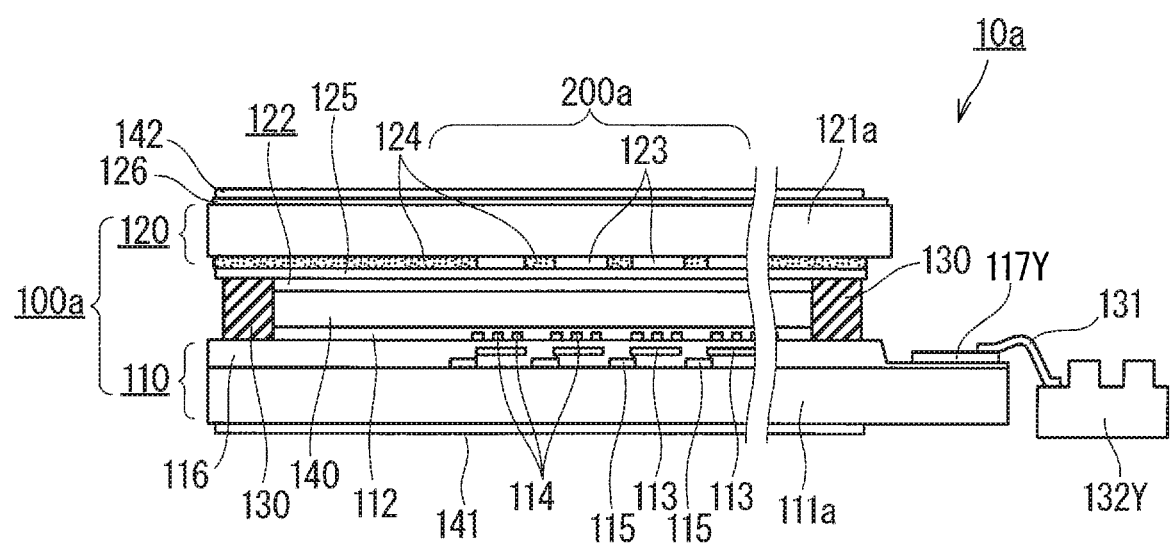
FIG. 7 is a cross-sectional view of a liquid crystal display according to a second preferred embodiment of the present invention.

The first preferred embodiment has described an instance where the present invention is applied to a curved liquid crystal display. Other than a curved liquid crystal display, the present invention is also effectively applicable to a liquid crystal display manufactured through a process that includes a process step of polishing for thickness reduction in which its mother glass substrates are processed to be thin (this process step is also called a slimming step). An example of such an applicable liquid crystal display is a thin model that includes glass substrates thinner than the thickness (i.e., 0.5 to 1.1 mm) of a typical mother glass substrate. To be specific, the present invention is applicable to a liquid crystal display whose display surface is an ordinary flat plate formed of a glass substrate that is less than 0.5 mm thick. Now, the following describes the configuration of a liquid crystal panel included in a liquid crystal display according to the second preferred embodiment, with reference to FIG. 7. This liquid crystal display is an instance where the present invention is applied to a liquid crystal display having a display surface in the form of an ordinary flat plate. FIG. 7 is a cross-sectional view of the entire liquid crystal display, and corresponds to FIG. 1 in the first preferred embodiment. Differences between the first and second embodiments will be described mainly.

A liquid crystal display 10*a* according to the second preferred embodiment includes a liquid crystal panel 100*a* that is different from the liquid crystal panel of the curved liquid crystal display 10 according to the first preferred embodiment. As shown in FIG. 7, the liquid crystal panel 100*a* has a display region (i.e., display surface) 200*a* in the form of an ordinary flat plate, as is the case with a typical liquid crystal display. The display surface 200*a* is provided for displaying an image. The liquid crystal panel 100*a* in the second preferred embodiment consists of the array substrate 110 and the counter substrate 120 that respectively includes a glass substrate 111*a* and a glass substrate 121*a*. Since the liquid crystal panel 100*a* does not have to be transformable into a curved shape, there is no need to reduce the thicknesses of the glass substrates 111*a* and 121*a* to about less than 0.2 mm. Herein, this is an example of a thin model of liquid crystal display that exerts its noticeable effect when the present invention is applied thereto. The thicknesses of the glass substrates 111*a* and 121*a* are accordingly set to be about less than 0.5 mm, which is slightly thinner than that of the corresponding substrates included in a typical liquid crystal display. By way of example only, the thicknesses of the glass substrates 111*a* and 121*a* are set to be about 0.3 mm (e.g., the thicknesses are regulated within a center value of 0.30 mm and tolerance of ±20%). The liquid crystal display 10*a* in the second preferred embodiment, which includes the glass substrates 111*a* and 121*a* that are less than 0.5 mm thick, is thinner and more lightweight than a typical liquid crystal display.

The liquid crystal panel 100*a* is in common with the liquid crystal panel 100 described in the first preferred embodiment in that the liquid crystal panel 100*a* is a liquid crystal panel in lateral-electric-field mode that operates by the use of TFTs as its switching elements, and that the liquid crystal panel 100*a* employs a FFS mode in particular. In addition, the glass substrates 111*a* and 121*a* of the array substrate 110 and counter substrate 120, constituting the liquid crystal panel 100*a*, are each provided with components that are not so different from the corresponding components disposed on the glass substrate 111 of the array substrate 110 forming the liquid crystal panel 100 and on the glass substrate 121 of the counter substrate 120 forming the liquid crystal panel 100. In the drawing, like components between the first and second preferred embodiments are denoted by the same signs, and will thus not be elaborated upon here.

The liquid crystal panel 100*a* in the second preferred embodiment includes the alignment film 122 disposed on the surface of the counter substrate 120. The configuration of this characteristic component in the present invention is similar to the configuration of the alignment film 122 in the first preferred embodiment. The alignment film 122 of the liquid crystal panel 100*a* in the second preferred embodiment will thus not be elaborated upon here.

As seen from the drawing, the entire configuration of the liquid crystal display 10*a* is different from the curved liquid crystal display 10 according to the first preferred embodiment in the following point: The liquid crystal display 10*a* does not have to be held in the form of a predetermined curved shape, and hence no longer needs to include components that are included in the curved liquid crystal display 10 according to the first preferred embodiment, such as a curved transparent protector having a curved shape alone, and a transparent adhesive sheet. The drawing thus omits these components.

In some preferred embodiments, the liquid crystal display 10*a* may have, instead of a curved transparent protector, a flat transparent protective plate attached thereto via a transparent adhesive sheet, when the liquid crystal display 10*a* is designed to be more resistant against an external pressure applied from its front surface and to be more resistant against moisture. Alternatively, when designed as a touch-panel-equipped product, the liquid crystal display 10*a* may have a touch panel attached thereto via a transparent adhesive sheet. In either case, a liquid crystal display that has a front panel, such as a curved transparent protector, transparent protector, or touch panel secured to the front surface of its liquid crystal panel, achieves common effects such as an improvement in resistance against an external pressure applied from the front surface, and an improvement in moisture resistance.

The foregoing has described the configuration of the liquid crystal display 10*a* and liquid crystal panel 100*a* according to the second preferred embodiment. The following describes a method for manufacturing the liquid crystal display 10*a* and liquid crystal panel 100*a* according to the second preferred embodiment. Differences between the first and second embodiments will be described mainly. The method includes process steps that are mostly similar to those described in the first preferred embodiment. A separate flowchart will thus be not provided herein. Differences in process steps between the first and second preferred embodiments will be described with reference to the flowchart of FIG. 4, used in the first preferred embodiment.

In the method for manufacturing the liquid crystal display 10*a* and liquid crystal panel 100*a* according to the second preferred embodiment, Steps S1 to S13 in the flowchart described in the first preferred embodiment are generally common. Although there is a difference in the thickness of the glass substrate in their final configuration between the liquid crystal panel 100 according to the first preferred embodiment and the liquid crystal panel 100*a* according to the second embodiment, the mother glass substrates that are used in Steps S1 to S9 are about 0.5 mm thick in the second preferred embodiment, as is the case with the corresponding mother glass substrates that are used in Steps S1 to S9 in the first preferred embodiment. Each process step included in the lighting check in Step TS, which is described in the first preferred embodiment with reference to FIGS. 5 and 6 appropriately, is also similarly performed in the second preferred embodiment.

In Step S9, i.e., polishing for thickness reduction (i.e., slimming step), the mother glass substrates each are polished into a thin plate that has a thickness different from the thickness of the corresponding glass substrate in the first preferred embodiment. To be specific, the thickness of the glass substrate is reduced to less than 0.5 mm, for instance, about 0.3 mm (e.g., the thickness is regulated within a center value of 0.30 mm and tolerance of ±20%). Since there is no need to transform the liquid crystal panel 100*a* into a curved shape in the second embodiment, Step S14, which, in the first preferred embodiment, corresponds to a process step of transformation into a curved shape and a process step of casing installation, is casing installation only. In this process step, the liquid crystal panel 100*a* is installed into a casing and held appropriately, with a backlight unit and other components disposed on the backside of the liquid crystal panel 100*a* via an optical sheet so as to face the liquid crystal panel 100*a*. Alternatively, in this process step, the liquid crystal panel 100*a* may undergo attachment of a flat transparent protective plate and/or touch panel via a transparent adhesive sheet when the liquid crystal panel 100*a* is designed to be more resistant against an external pressure applied from its front surface and/or designed as a touch-panel-equipped product.

The liquid crystal display 10*a* according to the second preferred embodiment is manufactured through the aforementioned slimming step, as is the case with the curved liquid crystal display 10 according to the first preferred embodiment. Thus, the mother counter substrate is not provided with transparent conductive films, such as an ITO film. Accordingly, at least in Step S1 (i.e., substrate cleaning) to Step S9 (i.e., polishing for thickness reduction), static electricity that occurs in each process step excites electric charges in the inside of the liquid crystal cell, particularly, in the surface of the mother counter substrate that is not provided with an electrode layer when a liquid crystal display in lateral-electric-field mode is employed, the surface being adjacent to the liquid crystal layer.

The method for manufacturing the liquid crystal display 10*a* according to the second preferred embodiment has the following features that are in common with the features of the method for manufacturing the curved liquid crystal display 10 according to the first preferred embodiment. One of the features is that the alignment film 122 on the counter substrate 120 includes the first layer 122L1 that, in particular, is disposed in the lower side of the alignment film 122 and is made of a high-photoconductivity alignment material. The other feature is that a process of performing light irradiation from outside after the substrate attachment step includes performing the lighting check in Step TS, particularly includes performing the light irradiation in Step TS2. The light irradiation in Step TS2 is included in the lighting check in Step TS and is a process step of light irradiation from the array substrate for a predetermined time period (i.e., a time period sufficient to achieve a function of static elimination) by the use of the backlight unit for use in lighting check.

With these features, the resistance of the first layer 122L1 of the alignment film 122, made of a high-photoconductivity alignment material, greatly lowers during Step TS2, i.e., light irradiation, thus eliminating electric charges occurring in the surface of the counter substrate 120 due to static electricity. In other words, the light irradiation in Step TS2 serves as a process by which a function of eliminating static electricity from the surface of the counter substrate 120. This avoids a failure occurrence, such as a bright-spot defect and/or display unevenness resulting from the static electricity, in the subsequent process step, i.e., faulty-display check in Step TS3. As a result of a function similar to the function described in the first preferred embodiment, the liquid crystal display according to the second embodiment, when operating for display, causes no decrease in voltage holding ratio (VHR) that could be a problem in particular.

As described above, the liquid crystal display 10*a* according to the second preferred embodiment is a liquid crystal display in lateral-electric-field mode that is manufactured through a process that includes a process step of polishing the glass substrates for thickness reduction to less than 0.5 mm. This process step is also called a slimming step. Light from the backlight is used at the time of a lighting check process to reduce the resistance of the alignment film, thus eliminating electric charges occurring in the surface of the counter substrate due to static electricity. This enables the liquid crystal panel to undergo a stable lighting check without being affected by a buildup of static electricity. This also enables improvement of defects in the display state, such as a bright-spot defect and/or display unevenness resulting from static electricity. This alternatively avoids temporary check fallout, thereby raising first run rate. In addition, when the liquid crystal display is operated for display, such a configuration involves no decrease in voltage holding ratio (VHR) that could be a problem in particular. Display quality consequently does not deteriorate due to a decrease in the voltage holding ratio (VHR) in particular. In addition, such a configuration eliminates the need for providing a dummy backside ITO, thereby achieving the aforementioned effects without a conspicuous cost increase.

The first and second preferred embodiments have described an instance where the present invention is applied to a liquid crystal display that includes the alignment film 122 on the counter substrate 120, and includes the alignment film 112 on the array substrate 110, the alignment films 122 and 112 each including a photoalignment film. The present invention is also applicable to a liquid crystal display that includes the alignment film 122, and the alignment film 112 on the array substrate 110, the alignment films 122 and 112 each being an alignment film formed by an alignment process through rubbing. In this case, an alignment film material that is applied onto the mother array substrate and the mother counter substrate through transfer needs to be changed to an alignment film material designed for rubbing, in Step S2, i.e., application of an alignment film material described in the first preferred embodiment, and the subsequent process step, i.e., alignment in Step S3, needs to be changed to an alignment process through rubbing.

An alignment film designed for rubbing needs to be made of a photoconductive material. To be specific, as is the case with the alignment films 112 and 122 in the first and second preferred embodiments, an alignment film designed for rubbing is used that has a photoconductivity in which the volume resistance value of the alignment film under light irradiation changes to at least not greater than $\frac{1}{10}$ of the volume resistance value of the alignment film under no light irradiation.

In many cases, a typical photoalignment film is made of a high-resistance material, that is, a material having a nigh volume resistance value. Thus, the alignment films 112 and 122 in the first and second preferred embodiments are each formed of a phase-separation photoalignment film whose upper and lower layers have different compositions and different properties. The upper layer of the phase-separation photoalignment film contains an alignment material having a photoalignment capability and a relatively high volume resistance value. The lower layer of the phase-separation photoalignment film contains a photoconductive alignment film. As a matter of course, when an alignment film designed for rubbing is used, a phase-separation photoalignment film may be selected. The upper layer of the phase-separation photoalignment film may contain an alignment film material designed for rubbing and having a high alignment capability with the emphasis on alignment capability. The lower layer of the phase-separation photoalignment film contains a photoconductive alignment film.

An alignment film designed for rubbing can be typically made of a material that has a lower volume resistance value than a photoalignment film. Accordingly, the alignment films 112 and 122 each may be formed of a single-layer alignment film designed for rubbing and having a photoconductivity. The single-layer alignment film in this case needs to have, as a guide, a photoconductivity in which the volume resistance value of the single-layer alignment film under light irradiation changes to at least not greater than $\frac{1}{10}$ of the volume resistance value of the single-layer alignment film under no light irradiation. To be more specific, the single-layer alignment film desirably has a photoconductivity in which the volume resistance value ranges about from $10^{14}$ to $10^{15}$ ($\Omega \cdot cm$) under no light irradiation, and the volume resistance value changes to about $10^{12}$ to $10^{13}$ ($\Omega \cdot cm$) under irradiation with light equivalent to light emitted from the backlight. An example of a selectable alignment film material that achieves this characteristic is a photoconductive material containing a polyimide formed by processing, as a precursor, a polyamide acid derived from a PMDA into an imide, the photoconductive material containing an alignment film material designed for rubbing.

In the aforementioned example where the alignment films 112 and 122 are each formed of a single-layer alignment film having a photoconductivity, the foregoing has described an instance where a single-layer film is used in an alignment film material designed for rubbing. In some cases, a single-layer photoalignment film has a photoconductivity in which its volume resistance value under light irradiation changes to at least not greater than $\frac{1}{10}$ of the volume resistance value under no light irradiation. Such a single-layer photoalignment film is usable and achieve the basic effects of the present invention in common, even if the single-layer photoalignment film has a relatively high resistance in its normal resistance property, that is, in its resistance property under no light irradiation.

In the example of the method for manufacturing the liquid crystal display according to the first preferred embodiment, with regard to the light irradiation that is performed so that its liquid crystal panel recovers from a bright-spot defect and/or display unevenness resulting from static electricity, the foregoing has described an instance where light emitted from the backlight 303 for use in lighting check, which is inherently included in the lighting check system, is mainly used to effectively perform light irradiation that achieves a function of recovering the liquid crystal panel from a bright-spot defect and/or display unevenness resulting from static electricity. This light irradiation is characteristic in the present invention. The light irradiation does not have to be performed with the lighting check system in particular, if light irradiation from the array substrate 110 is possible. The light irradiation may be performed in another process step and with another system. The light irradiation is performed after the attachment of the mother array substrate and mother counter substrate, and before the lighting check in Step TS. This enables electric charges remaining in the inner surface of each substrate to be eliminated effectively.

When the static elimination process through light irradiation has been completed before the lighting check using the lighting check system in Step TS, there is no need for an additional process step, i.e., light irradiation for a predetermined time period in Step TS2, thereby improving the tact time of the lighting check in Step TS per se. In addition, the side auxiliary lights 307, front auxiliary lights 308, optical film 309, and other components, all of which are provided for performing the light irradiation using the lighting check system 300 in Step TS2, are no longer necessary. Consequently, a typical lighting check system can be used.

A method may be selected that includes separately performing a light irradiation process after the attachment of the mother array substrate and mother counter substrate and before the lighting check in Step TS. This light irradiation process can be performed by, for instance, in each process step performed between these process steps, to be specific, in the ultraviolet (UV) irradiation in Step S7 and the after-cure in Step S8, making a modification, as appropriate, to a UV irradiation system and an after-cure system, which are used in Steps S7 and S8, so that each of the systems includes a light source and other things with which light irradiation from the array substrate 110 is performed on its stage.

As is the case with the lighting check system according to the first preferred embodiment, the lighting check system according to the second preferred embodiment may include an auxiliary light source, as appropriate, so that the mother cell substrate on a processing system can be irradiated with light from the side surface or can be irradiated with light from the upper surface as well. The lighting check system according to the first preferred embodiment includes the optical film 309 that regulates a dispersion property. The lighting check system according to the second preferred embodiment may include this optical film 309 as well and may be configured such that light dispersed from the array substrate 110 is casted upon the mother cell substrate via the optical film, which regulates the dispersion property. Selecting the aforementioned method eliminates the need for separately providing a dedicated light irradiation system and a process step of light irradiation. This establishes a manufacturing line where a process of manufacturing the liquid crystal display in the present invention at relatively low costs.

Conversely, a method can be selected that includes separately performing light irradiation after the attachment of the mother array substrate and mother counter substrate and before the lighting check in Step TS. In this method, a process of static elimination through light irradiation is performed in, but not limited to, each of already-existing Steps S7 to S11 using the corresponding system. For static elimination, such a process of light irradiation that is performed for recovering the liquid crystal panel from a bright-spot defect and/or display unevenness resulting from static electricity may be separately performed between each of Steps S7 to S11.

For instance, in the process steps after the formation of a transparent conductive film in Step S10, the antistatic transparent conductive layer 126 functions, thereby further less increasing the amount of electric charges within the cell. It is hence desirable to perform this light irradiation after the formation of a transparent conductive film in Step S10 to eliminate the electric charges within the cell. For effectiveness, the light irradiation process is desirably performed before Step S11, i.e., cell division, so as to be performed on the mother cell substrate in a collective manner. Thus, providing a process step of separately performing light irradiation between Step S10 (i.e., formation of a transparent conductive film) and Step S11 (i.e., cell division) and providing a light irradiation system for use in this separate light irradiation enable effective light irradiation that is performed to recover the liquid crystal panel from a bright-spot defect and/or display unevenness resulting from static electricity.

The aforementioned method eliminates the need for adding a process of performing, using a lighting check system, light irradiation for a predetermined time period in the light irradiation in Step TS2. This method also eliminates a restriction such as the addition of a light source to an already-existing processing system. Consequently, the method can provide an optimal system configuration that is specialized in light irradiation that is performed for recovering the liquid crystal panel from a bright-spot defect and/or display unevenness resulting from static electricity. The already-existing processing system and the light irradiation system that is to be separately prepared need to be newly provided, but can be provided at considerably lower cost than a deposition system that is necessary to form a dummy backside ITO, and an etching system, because these systems have their relatively simple configurations in which components, such as a signal application means necessary for driving, and a polarizer for use in check, which are components necessary for displaying a test screen on a liquid crystal panel, are omitted from the lighting check system 300 described in the first preferred embodiment.

The present invention is not limited to the first and second preferred embodiments and their modifications, or to configurations that suggest modifications. Part of the configuration of the present invention can be modified to a publicly known configuration, as appropriate, without departing from the scope of the present invention. The configurations of the first and second preferred embodiments and of their modifications, or the configurations that suggest modifications can be combined with each other unless otherwise contradicted, thereby achieving an effect of each configuration and an effect of the combined configurations.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display comprising:
a liquid crystal panel in a lateral-electric-field mode, the liquid crystal panel comprising
an array substrate and a counter substrate, the array substrate and the counter substrate comprising a pair of transparent insulating substrates facing each other and processed into a thin plate that is less than 0.5 mm thick,
a sealant disposed between the pair of transparent insulating substrates, and
a liquid crystal layer sealed in a region defined by the sealant disposed between the pair of transparent insulating substrates; and
an alignment film disposed on the counter substrate, the alignment film being made of a material having a photoconductivity in which a volume resistance value of the alignment film under light irradiation changes to at least not greater than $\frac{1}{10}$ of the volume resistance value of the alignment film under no light irradiation.
2. The liquid crystal display according to claim 1, wherein in the photoconductivity, the volume resistance value of the alignment film under light irradiation ranges from $10^{12}$ Ω·cm or more to $10^{13}$ Ω·cm or less, and the volume resistance value of the alignment film under no light irradiation ranges from $10^{14}$ Ω·cm or more to $10^{15}$ Ω·cm or less.
3. The liquid crystal display according to claim 1, wherein in a thickness direction of the alignment film, the alignment film comprises
a first layer region disposed on a relatively lower side and,
a second layer region disposed on an upper side with respect to the first layer region,
the first layer region and the second layer region mainly contain respective alignment agents comprising polyimides different from each other,
the first layer region contains the material having the photoconductivity, and
the polyimide that is the alignment agent mainly contained in the second layer region has a higher rate of processing into an imide than the polyamide that is the alignment agent mainly contained in the first layer region.
4. The liquid crystal display according to claim 3, wherein the polyimide that is the alignment agent mainly contained in the second layer region comprises a precursor having a photoalignment capability, the precursor being processed into an imide.

5. The liquid crystal display according to claim 3, wherein the polyimide that is the alignment agent mainly contained in the first layer region comprises, as a precursor, a polyamide acid derived from a pyromellitic dianhydride, the polyamide acid being processed into an imide.

6. The liquid crystal display according to claim 3, wherein the second layer region has a volume resistance value of $10^{15}$ Ω·cm or more under both light irradiation and no light irradiation.

7. The liquid crystal display according to claim 1, wherein the liquid crystal panel is transformed into a curved shape, and has a curved display surface.

8. The liquid crystal display according to claim 7, wherein the pair of transparent insulating substrates is processed into a thin plate that is less than 0.2 mm thick.

9. The liquid crystal display according to claim 1, further comprising a front panel secured to a front surface of the liquid crystal panel via a transparent adhesive sheet.

10. A method for manufacturing a liquid crystal display comprising a liquid crystal panel in a lateral-electric-field mode, the method comprising:
    preparing a mother array substrate and a mother counter substrate, the mother array substrate and the mother counter substrate comprising a pair of respective transparent insulating substrates on which an array substrate and a counter substrate are to be imposed;
    forming an alignment film on the mother counter substrate, the alignment film being made of a material having a photoconductivity in which a volume resistance value of the alignment film under light irradiation changes to at least not greater than 1/10 of the volume resistance value of the alignment film under no light irradiation;
    attaching the mother array substrate and the mother counter substrate to each other via a liquid crystal layer and a sealant to form a mother cell substrate;
    processing the pair of transparent insulating substrates into a thin plate that is less than 0.5 mm thick, by reducing a surface of the mother array substrate and a surface of the mother counter substrate, the surface of the mother array substrate and the surface of the mother counter substrate constituting outer surfaces of the mother cell substrate;
    forming a transparent conductive film on the surface of the mother counter substrate after the step of processing the pair of transparent insulating substrates into the thin plate; and
    performing light irradiation from the array substrate for a predetermined time period after the step of attaching the mother array substrate and the mother counter substrate to each other.

11. The method according to claim 10, comprising performing a lighting check,
    wherein the step of performing the lighting check comprises
        lighting up a backlight for use in the lighting check, the backlight being disposed behind the liquid crystal panel, and
        checking a display state by displaying a test screen with the backlight remaining on, and
    the step of performing the light irradiation from the array substrate comprises performing light irradiation for a predetermined time period using the backlight before the step of checking the display state in the step of performing the lighting check is started.

12. The method according to claim 11, wherein
    a lighting check system that is used in the step of performing the lighting check comprises an optical film disposed between the backlight and the liquid crystal panel, the optical film being configured to regulate a dispersion property of light emitted from the backlight, and
    the liquid crystal panel is irradiated with the light via the optical film.

13. The method according to claim 11, wherein
    a lighting check system that is used in the step of performing the lighting check comprises, in addition to the backlight, a light source configured to perform irradiation from a front surface of the liquid crystal panel or from a side surface of the liquid crystal panel, and
    the step of performing the light irradiation from the array substrate comprises performing light irradiation from the array substrate and from the front surface or side surface of the liquid crystal panel.

14. The method according to claim 13, wherein
    the lighting check system, which is used in the step of performing the lighting check, comprises an optical film disposed between the backlight and the liquid crystal panel, the optical film being configured to regulate a dispersion property of light emitted from the backlight, and
    the liquid crystal panel is irradiated with the light via the optical film.

15. The method according to claim 10, comprising performing a lighting check,
    wherein the step of performing the lighting check comprises
        lighting up a backlight for use in the lighting check, the backlight being disposed behind the liquid crystal panel, and
        checking a display state by displaying a test screen with the backlight remaining on, and
    the step of performing the light irradiation from the array substrate comprises separately performing light irradiation from the array substrate before the step of performing the lighting check.

16. The method according to claim 15, wherein the step of performing the light irradiation from the array substrate comprises performing light irradiation using a light source included in any of processing systems that are used in respective process steps that are performed after the step of attaching the mother array substrate and the mother counter substrate to each other and before the step of performing the lighting check.

17. The method according to claim 15, comprising dividing the mother cell substrate into separate liquid crystal cells after the step of forming the transparent conductive film,
    wherein the step of performing the light irradiation from the array substrate is performed after the step of forming the transparent conductive film and before the step of dividing the mother cell substrate into the separate liquid crystal cells.

18. The liquid crystal display according to claim 1, wherein the alignment film includes an alignment agent with a concentration that decreases gradually in a thickness direction of the alignment film.

* * * * *